United States Patent
Raghavan et al.

(10) Patent No.: US 12,250,038 B2
(45) Date of Patent: *Mar. 11, 2025

(54) BEAM TRAINING IN LARGE BANDWIDTH MILLIMETER WAVE SYSTEMS

(71) Applicant: QUALCOMM Incorporated, San Diego, CA (US)

(72) Inventors: Vasanthan Raghavan, West Windsor Township, NJ (US); Junyi Li, Fairless Hills, PA (US)

(73) Assignee: QUALCOMM Incorporated, San Diego, CA (US)

(*) Notice: Subject to any disclaimer, the term of this patent is extended or adjusted under 35 U.S.C. 154(b) by 277 days.

This patent is subject to a terminal disclaimer.

(21) Appl. No.: 18/051,589

(22) Filed: Nov. 1, 2022

(65) Prior Publication Data

US 2023/0110240 A1   Apr. 13, 2023

Related U.S. Application Data

(63) Continuation of application No. 17/344,266, filed on Jun. 10, 2021, now Pat. No. 11,522,592.

(60) Provisional application No. 63/042,358, filed on Jun. 22, 2020.

(51) Int. Cl.
H04B 7/06 (2006.01)
(52) U.S. Cl.
CPC ......... *H04B 7/0617* (2013.01); *H04B 7/0632* (2013.01)
(58) Field of Classification Search
CPC .. H04B 7/0617; H04B 7/0632; H04B 7/0695; H04B 7/0404

USPC ............................... 375/267; 455/63.1
See application file for complete search history.

(56) References Cited

U.S. PATENT DOCUMENTS

| | | | |
|---|---|---|---|
| 2018/0026683 A1 | 1/2018 | Manholm et al. | |
| 2018/0241452 A1* | 8/2018 | Akkarakaran | H04W 72/0446 |
| 2018/0376429 A1* | 12/2018 | Islam | H04W 74/006 |
| 2019/0104449 A1 | 4/2019 | Oketani | |
| 2019/0364449 A1 | 11/2019 | Yang et al. | |
| 2020/0021337 A1 | 1/2020 | Wang et al. | |
| 2020/0145070 A1* | 5/2020 | Raghavan | H04W 24/02 |
| 2021/0399779 A1 | 12/2021 | Raghavan | |
| 2022/0123812 A1 | 4/2022 | Osterling | |

(Continued)

OTHER PUBLICATIONS

International Search Report and Written Opinion—PCT/US2021/036994—ISA/EPO—Sep. 28, 2021.

*Primary Examiner* — Don N Vo
(74) *Attorney, Agent, or Firm* — Kevin M. Donnelly; Holland & Hart LLP

(57) ABSTRACT

Methods, systems, and devices for wireless communications are described. A user equipment (UE) may be configured with a set of beamforming weights, each beamforming weight corresponding to a transmit beam of a set of transmit beams that may each include a same primary lobe and one or more different side lobes. The UE may then perform a beam training procedure to determine which transmit beams cause more or less interference at one or more nearby UEs. The UE may transmit signals using one or more of the transmit beams, and the nearby UEs may determine which transmit beams and corresponding beamforming weights cause more or less interference. The nearby UEs may then indicate those transmit beams or beamforming weights that cause more or less interference via different options.

30 Claims, 21 Drawing Sheets

(56) References Cited

U.S. PATENT DOCUMENTS

2022/0167241 A1    5/2022  Kenington
2023/0033880 A1*   2/2023  Hormis ................ H04B 7/0456

* cited by examiner

BEAM TRAINING IN LARGE BANDWIDTH MILLIMETER WAVE SYSTEMS

CROSS REFERENCE

The present Application for Patent is a Continuation of U.S. patent application Ser. No. 17/344,266 by RAGHAVAN et al., entitled, "BEAM TRAINING IN LARGE BANDWIDTH MILLIMETER WAVE SYSTEMS" filed Jun. 10, 2021, which claims the benefit of U.S. Provisional Patent Application No. 63/042,358 by RAGHAVAN et al., entitled "BEAM TRAINING IN LARGE BANDWIDTH MILLIMETER WAVE SYSTEMS," filed Jun. 22, 2020, each of which are assigned to the assignee hereof, and each of which is expressly incorporated by reference herein.

TECHNICAL FIELD

The following relates generally to wireless communications and more specifically to beam training in large bandwidth millimeter wave (mmW) systems.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some wireless communications systems (for example, higher frequency ranges, such as frequency range 2 (FR2), frequency range 3 (FR3), frequency range 4 (FR4), or frequencies above 7.125 gigahertz (GHz)), larger antenna arrays may be used for beamforming transmissions between UEs and base stations. In some cases, these larger antenna arrays may result in producing larger side lobes for beamformed transmissions, which may adversely increase interference at other devices, such as UEs.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communications at a first UE. The method includes determining sets of beamforming weights for uplink communications, each set of the sets of beamforming weights corresponding to a respective transmit beam of a set of transmit beams, each transmit beam of the set of transmit beams having a same main lobe signal strength property as each other transmit beam of the set of transmit beams, and each transmit beam of the set of transmit beams further having one or more side lobe signal strength properties that are different than one or more side lobe signal strength properties of each of the other transmit beams of the set of transmit beams, transmitting a set of signals, each signal of the set of signals transmitted on a respective transmit beam of the set of transmit beams, receiving an indication of a subset of the sets of beamforming weights after transmitting the set of signals based on at least a first transmit beam of the set of transmit beams corresponding to a first set of beamforming weight of the sets of beamforming weights causing interference at a second UE, and transmitting a second signal using a second set of beamforming weights of the sets of beamforming weights based on the indication, the subset of the sets of beamforming weights including the second set of beamforming weights.

Another innovative aspect of the subject matter described in this disclosure can be implemented in an apparatus for wireless communications at a first UE. The apparatus may include a processor, memory coupled with the processor, and instructions stored in the memory. The instructions may be executable by the processor to cause the apparatus to determine sets of beamforming weights for uplink communications, each set of the sets of beamforming weights corresponding to a respective transmit beam of a set of transmit beams, each transmit beam of the set of transmit beams having a same main lobe signal strength property as each other transmit beam of the set of transmit beams, and each transmit beam of the set of transmit beams further having one or more side lobe signal strength properties that are different than one or more side lobe signal strength properties of each of the other transmit beams of the set of transmit beams, transmit a set of signals, each signal of the set of signals transmitted on a respective transmit beam of the set of transmit beams, receive an indication of a subset of the sets of beamforming weights after transmitting the set of signals based on at least a first transmit beam of the set of transmit beams corresponding to a first set of beamforming weight of the sets of beamforming weights causing interference at a second UE, and transmit a second signal using a second set of beamforming weights of the sets of beamforming weights based on the indication, the subset of the sets of beamforming weights including the second set of beamforming weights.

Another innovative aspect of the subject matter described in this disclosure can be implemented in an apparatus for wireless communications at a first UE. The apparatus may include means for determining sets of beamforming weights for uplink communications, each set of the sets of beamforming weights corresponding to a respective transmit beam of a set of transmit beams, each transmit beam of the set of transmit beams having a same main lobe signal strength property as each other transmit beam of the set of transmit beams, and each transmit beam of the set of transmit beams further having one or more side lobe signal strength properties that are different than one or more side lobe signal strength properties of each of the other transmit beams of the set of transmit beams, transmitting a set of signals, each signal of the set of signals transmitted on a respective transmit beam of the set of transmit beams, receiving an indication of a subset of the sets of beamforming weights after transmitting the set of signals based on at least a first transmit beam of the set of transmit beams corresponding to a first set of beamforming weight of the sets of beamforming weights causing interference at a second UE, and transmitting a second signal using a second set of beamforming weights of the sets of beamforming weights based on the indication, the subset of the sets of beamforming weights including the second set of beamforming weights.

Another innovative aspect of the subject matter described in this disclosure can be implemented in a non-transitory computer-readable medium storing code for wireless communications at a first UE. The code may include instructions executable by a processor to determine sets of beamforming weights for uplink communications, each set of the sets of beamforming weights corresponding to a respective transmit beam of a set of transmit beams, each transmit beam of the set of transmit beams having a same main lobe signal strength property as each other transmit beam of the set of transmit beams, and each transmit beam of the set of transmit beams further having one or more side lobe signal strength properties that are different than one or more side lobe signal strength properties of each of the other transmit beams of the set of transmit beams, transmit a set of signals, each signal of the set of signals transmitted on a respective transmit beam of the set of transmit beams, receive an indication of a subset of the sets of beamforming weights after transmitting the set of signals based on at least a first transmit beam of the set of transmit beams corresponding to a first set of beamforming weight of the sets of beamforming weights causing interference at a second UE, and transmit a second signal using a second set of beamforming weights of the sets of beamforming weights based on the indication, the subset of the sets of beamforming weights including the second set of beamforming weights.

Another innovative aspect of the subject matter described in this disclosure can be implemented in a method for wireless communications at a UE. The method includes receiving, from a first UE, an indication of a training procedure to determine one or more sets of beamforming weights of sets of beamforming weights to be used by the first UE to transmit, each set of the sets of beamforming weights corresponding to a respective transmit beam of a set of transmit beams, each transmit beam of the set of transmit beams having a same main lobe signal strength property as each other transmit beam of the set of transmit beams, and each transmit beam of the set of transmit beams further having one or more side lobe signal strength properties that are different than one or more side lobe signal strength properties of each of the other transmit beams of the set of transmit beams, receiving, from the first UE, a set of signals, each signal of the set of signals received from a respective transmit beam of the set of transmit beams, determining that one or more of the set of signals from the first UE interfere with reception of a second signal at the UE, and transmitting, based on the determining, an indication of a subset of the sets of beamforming weights related to subsequent transmissions by the first UE.

Another innovative aspect of the subject matter described in this disclosure can be implemented in an apparatus for wireless communications at a UE. The apparatus may include a processor, memory coupled with the processor, and instructions stored in the memory. The instructions may be executable by the processor to cause the apparatus to receive, from a first UE, an indication of a training procedure to determine one or more sets of beamforming weights of sets of beamforming weights to be used by the first UE to transmit, each set of the sets of beamforming weights corresponding to a respective transmit beam of a set of transmit beams, each transmit beam of the set of transmit beams having a same main lobe signal strength property as each other transmit beam of the set of transmit beams, and each transmit beam of the set of transmit beams further having one or more side lobe signal strength properties that are different than one or more side lobe signal strength properties of each of the other transmit beams of the set of transmit beams, receive, from the first UE, a set of signals, each signal of the set of signals received from a respective transmit beam of the set of transmit beams, determine that one or more of the set of signals from the first UE interfere with reception of a second signal at the UE, and transmit, based on the determining, an indication of a subset of the sets of beamforming weights related to subsequent transmissions by the first UE.

Another innovative aspect of the subject matter described in this disclosure can be implemented in an apparatus for wireless communications at a UE. The apparatus may include means for receiving, from a first UE, an indication of a training procedure to determine one or more sets of beamforming weights of sets of beamforming weights to be used by the first UE to transmit, each set of the sets of beamforming weights corresponding to a respective transmit beam of a set of transmit beams, each transmit beam of the set of transmit beams having a same main lobe signal strength property as each other transmit beam of the set of transmit beams, and each transmit beam of the set of transmit beams further having one or more side lobe signal strength properties that are different than one or more side lobe signal strength properties of each of the other transmit beams of the set of transmit beams, receiving, from the first UE, a set of signals, each signal of the set of signals received from a respective transmit beam of the set of transmit beams, determining that one or more of the set of signals from the first UE interfere with reception of a second signal at the UE, and transmitting, based on the determining, an indication of a subset of the sets of beamforming weights related to subsequent transmissions by the first UE.

Another innovative aspect of the subject matter described in this disclosure can be implemented in a non-transitory computer-readable medium storing code for wireless communications at a UE. The code may include instructions executable by a processor to receive, from a first UE, an indication of a training procedure to determine one or more sets of beamforming weights of sets of beamforming weights to be used by the first UE to transmit, each set of the sets of beamforming weights corresponding to a respective transmit beam of a set of transmit beams, each transmit beam of the set of transmit beams having a same main lobe signal strength property as each other transmit beam of the set of transmit beams, and each transmit beam of the set of transmit beams further having one or more side lobe signal strength properties that are different than one or more side lobe signal strength properties of each of the other transmit beams of the set of transmit beams, receive, from the first UE, a set of signals, each signal of the set of signals received from a respective transmit beam of the set of transmit beams, determine that one or more of the set of signals from the first UE interfere with reception of a second signal at the UE, and transmit, based on the determining, an indication of a subset of the sets of beamforming weights related to subsequent transmissions by the first UE.

Another innovative aspect of the subject matter described in this disclosure can be implemented in a method for wireless communications at a base station. The method includes establishing a communication link with a UE, receiving, from the UE, an indication of a subset of sets of beamforming weights related to subsequent transmissions by a first UE based on a first set of beamforming weights of the sets of beamforming weights causing interference at the UE, and transmitting, to a device, the indication of the subset of sets of beamforming weights based on receiving the indication of the subset of sets of beamforming weights from the second UE.

Another innovative aspect of the subject matter described in this disclosure can be implemented in an apparatus for wireless communications at a base station. The apparatus may include a processor, memory coupled with the processor, and instructions stored in the memory. The instructions may be executable by the processor to cause the apparatus to establish a communication link with a UE, receive, from the UE, an indication of a subset of sets of beamforming weights related to subsequent transmissions by a first UE based on a first set of beamforming weights of the sets of beamforming weights causing interference at the UE, and transmit, to a device, the indication of the subset of sets of beamforming weights based on receiving the indication of the subset of sets of beamforming weights from the second UE.

Another innovative aspect of the subject matter described in this disclosure can be implemented in an apparatus for wireless communications at a base station. The apparatus may include means for establishing a communication link with a UE, receiving, from the UE, an indication of a subset of sets of beamforming weights related to subsequent transmissions by a first UE based on a first set of beamforming weights of the sets of beamforming weights causing interference at the UE, and transmitting, to a device, the indication of the subset of sets of beamforming weights based on receiving the indication of the subset of sets of beamforming weights from the second UE.

Another innovative aspect of the subject matter described in this disclosure can be implemented in a non-transitory computer-readable medium storing code for wireless communications at a base station. The code may include instructions executable by a processor to establish a communication link with a UE, receive, from the UE, an indication of a subset of sets of beamforming weights related to subsequent transmissions by a first UE based on a first set of beamforming weights of the sets of beamforming weights causing interference at the UE, and transmit, to a device, the indication of the subset of sets of beamforming weights based on receiving the indication of the subset of sets of beamforming weights from the second UE.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings, and the claims.

DETAILED DESCRIPTION

Figure 1:
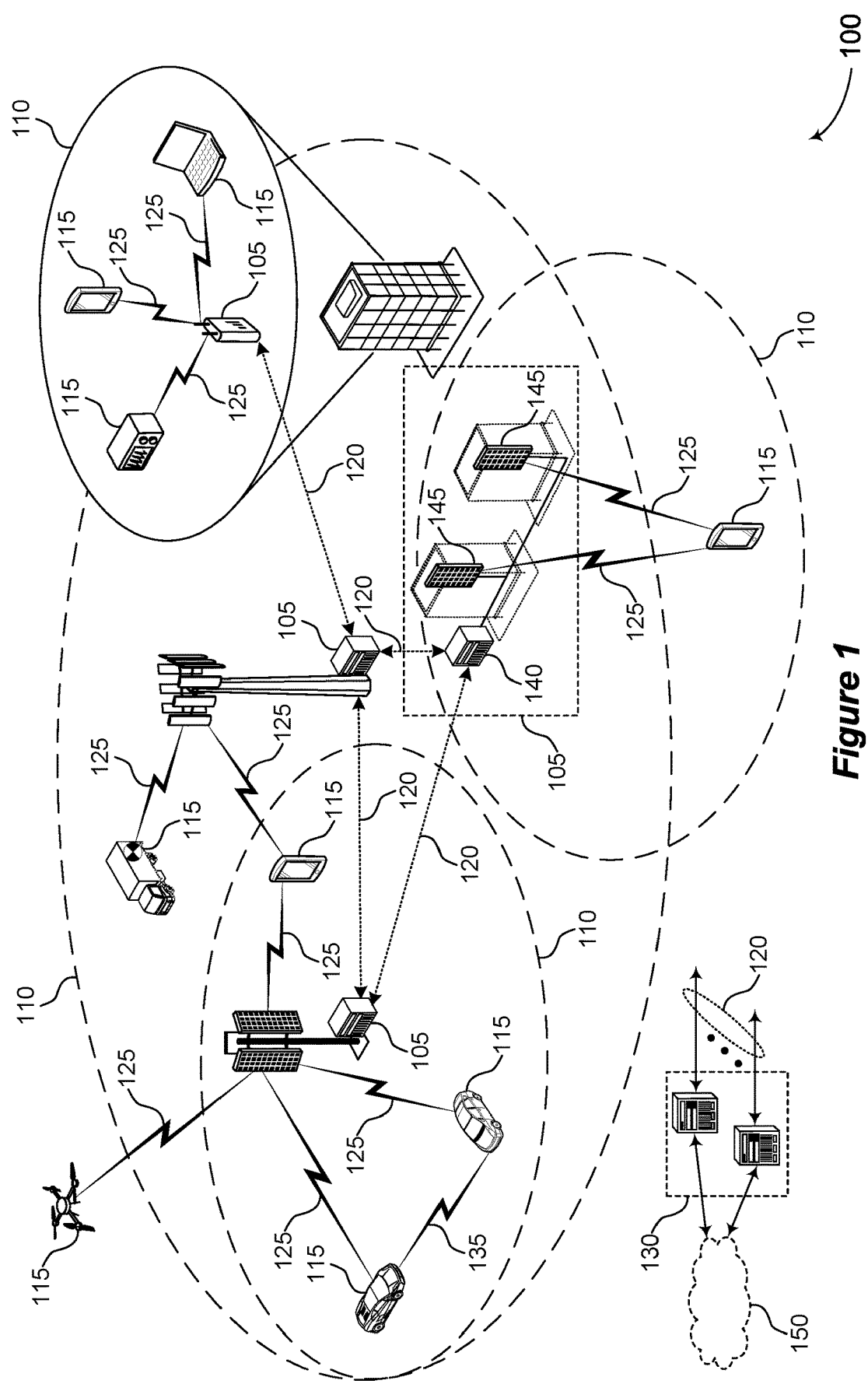
FIG. 1 illustrates an example of a system for wireless communications that supports beam training in large bandwidth millimeter wave (mmW) systems in accordance with aspects of the present disclosure.

In some wireless communications systems (for example, those operating in higher frequency ranges, such as frequency range 2 (FR2), frequency range 3 (FR3), frequency range 4 (FR4), or frequencies above 7.125 gigahertz (GHz)), various wireless devices may use larger antenna arrays for beamforming transmissions between the various wireless devices. In some implementations, these larger antenna arrays may result in producing relatively higher (for example, larger) side lobes for beamformed transmissions, which may adversely increase interference at other wireless devices. Techniques for reducing interference are desired.

Various aspects generally relate to a user equipment (UE) performing a beam training procedure to determine which sets of beamforming weights and corresponding transmit beams from different options cause more or less interference at nearby UEs, and more specifically to the UE receiving feedback about various sets of beamforming weights and corresponding transmit beams so that the UE can select one or more sets of beamforming weights and corresponding transmit beams to use to mitigate interference at other devices, such as other UEs. To mitigate interference, a base station may configure a UE with multiple sets of beamforming weights (for example, a set of beam options) that may each result in a transmit beam of a set of transmit beams that include a same main lobe signal strength property (for example, a same primary beam setting or characteristic, such as a same main lobe steering direction and a same main lobe beamwidth) as the other transmit beams in the set of transmit beams and different side lobe signal strength properties (for example, different side lobe settings or characteristics) than the other transmit beams in the set of transmit beams. That is, each set of the multiple sets of beamforming weights may correspond to a different transmit beam of the set of transmit beams, in which each transmit beam of the set of transmit beams may have a same main lobe (for example, corresponding to a same main lobe signal strength property) as each of the other transmit beams and different side lobes (for example, corresponding to a different side lobe signal strength properties) for the respective transmit beams. The UE may then perform a beam training procedure to determine which sets of beamforming weights and corresponding transmit beams cause less or more interference at nearby UEs. As part of the beam training procedure, the UE may transmit signals using one or more transmit beams that a respective set of beamforming weights of the multiple sets of beamforming weights creates, and the nearby UEs may determine which transmit beams and corresponding sets of beamforming weights cause more or less interference.

Particular aspects of the subject matter described in this disclosure may be implemented to realize one or more of the following potential advantages. The described communication devices may perform operations that may provide improvements to interference management and mitigation for multiple communication devices. In some implementations, a communication device may determine which sets of beamforming weights and corresponding transmit beams out of multiple sets of beamforming weights and transmit beams cause more interference than other beamforming weights of the set at nearby devices. The communication device may transmit subsequent communications using sets of beamforming weights and transmit beams that cause less interference, reducing transmissions to the nearby devices that interference may have otherwise impacted from the communication device and reducing the number of retransmissions that the communication device may use due to avoiding interference and other issues. With fewer retransmissions, the communication device may enable the nearby devices to increase power efficiency by processing fewer messages along with decreasing latency of related operations and processing.

Aspects of the disclosure are initially described in the context of wireless communications systems. Additionally, aspects of the disclosure are illustrated through an additional wireless communications system, an antenna array gain, and a process flow. Aspects of the disclosure are further illustrated by and described with reference to apparatus diagrams, system diagrams, and flowcharts that relate to beam training in large bandwidth millimeter wave (mmW) systems.

FIG. 1 illustrates an example of a wireless communications system 100 that supports beam training in large bandwidth mmW systems in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support one or more of enhanced broadband communications, ultra-reliable (for example, mission critical) communications, low latency communications, or communications with low-cost and low-complexity devices.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (for example, via an S1, N2, N3, or other interface). The base stations 105 may communicate with one another over the backhaul links 120 (for example, via an X2, Xn, or other interface) either directly (for example, directly between the base stations 105), or indirectly (for example, via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, in which the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier may also have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode in which initial acquisition and connection may be conducted by the UEs 115 via the carrier, or the carrier may be operated in a non-standalone mode in which a connection is anchored using a different carrier (for example, of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier, in which the symbol period and subcarrier spacing are inversely related. The number of bits carried by each resource element may depend on the modulation scheme (for example, the order of the modulation scheme, the coding rate of the modulation scheme, or both). The more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported, in which a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, in which $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol periods in a TTI) may be variable. Additionally or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example one or more of a macro cell, a small cell, a hot spot, or other types of cells. The term "cell" may refer to a logical communication entity used for communication with a base station 105 (for example, over a carrier) and may be associated with an identifier for distinguishing neighboring cells (for example, a physical cell identifier (PCID), a virtual cell identifier (VCID), or others). In some examples, a cell may also refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (for example, several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (for example, MTC, narrowband IoT (NB-IoT), enhanced mobile broadband (eMBB)) that may provide access for different types of devices.

In some examples, a base station 105 may be movable and provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode if not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RB s)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (for example, the UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (for example, the base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or each base station 105 may be distributed across various network devices (for example, radio heads and ANCs) or consolidated into a single network device (for example, a base station 105).

The wireless communications system 100 may operate using one or more frequency bands, typically in the range of 300 megahertz (MHz) to 300 GHz. Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some examples, the wireless communications system 100 may support mmW communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. If operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), in which multiple spatial layers are transmitted to the same receiving device, and multiple-user MIMO (MU-MIMO), in which multiple spatial layers are transmitted to multiple devices.

Beamforming, which may also be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (for example, by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (for example, by a base station 105 or a UE 115) may be performed using multiple beam directions, and the device may use a combination of digital precoding or radio frequency beamforming to generate a combined beam for transmission (for example, from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

A receiving device (for example, a UE 115) may try multiple receive configurations (for example, directional listening) if receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, if receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback, in which the device may provide HARQ feedback in a specific slot for data received in a previous symbol in the slot. In other cases, the device may provide HARQ feedback in a subsequent slot, or according to some other time interval.

Some wireless communications systems (for example, higher frequency ranges, such as FR2, FR3, FR4, or frequencies above 7.125 GHz) may use larger antenna arrays for beamforming transmissions between a UE 115 and a base station 105. In some implementations, these larger antenna arrays may result in producing higher (for example, larger) side lobes for beamformed transmissions, which may increase interference at other wireless devices. For example, side lobes at some angles may be a consequence of the beam weights that are designed to steer energy via the main lobe in a particular set of directions. In some implementations, the side lobes are low in amplitude, such that nearby wireless devices are not impacted to a noticeable or affecting degree. However, with the higher frequency ranges and larger antenna arrays, the side lobes may be larger in amplitude or include different angles that affect communications of nearby wireless devices. Techniques for reducing interference are desired.

Various aspects generally relate to interference mitigation and management and, more specifically, to a UE 115 performing a beam training procedure using multiple sets of beamforming weights that correspond to a set of transmit beams for determining which sets of beamforming weights and corresponding transmit beams result in more or less interference at nearby wireless devices (such as additional UEs 115). In some aspects, each set of the multiple sets of beamforming weights and corresponding transmit beams may include a same or similar main lobe signal strength property (for example, a same primary beam setting or characteristic, such as a same main lobe steering direction and a same main lobe beamwidth) and different side lobe signal strength properties (for example, different side lobe settings or characteristics) with respect to the other transmit beams in the set of transmit beams. In some implementations, the UE 115 may perform the beam training procedure with nearby UEs 115 by transmitting signals on multiple uplink transmit beams to a base station 105, in which the nearby UEs 115 indicate which uplink transmit beams, the corresponding sets of beamforming weights, or both that cause more or less interference at the nearby UEs 115 to the UE 115. For example, the nearby UEs 115 may report a single transmit beam/set of beamforming weights for the UE 115 to use for subsequent communications with the base station 105 (for example, uplink communications), a subset of the transmit beams/sets of beamforming weights for the UE 115 to use for subsequent communications (for example, in a ranked list), or one or more transmit beams/sets of beamforming weights for the UE 115 to not use for subsequent communications.

Figure 2:
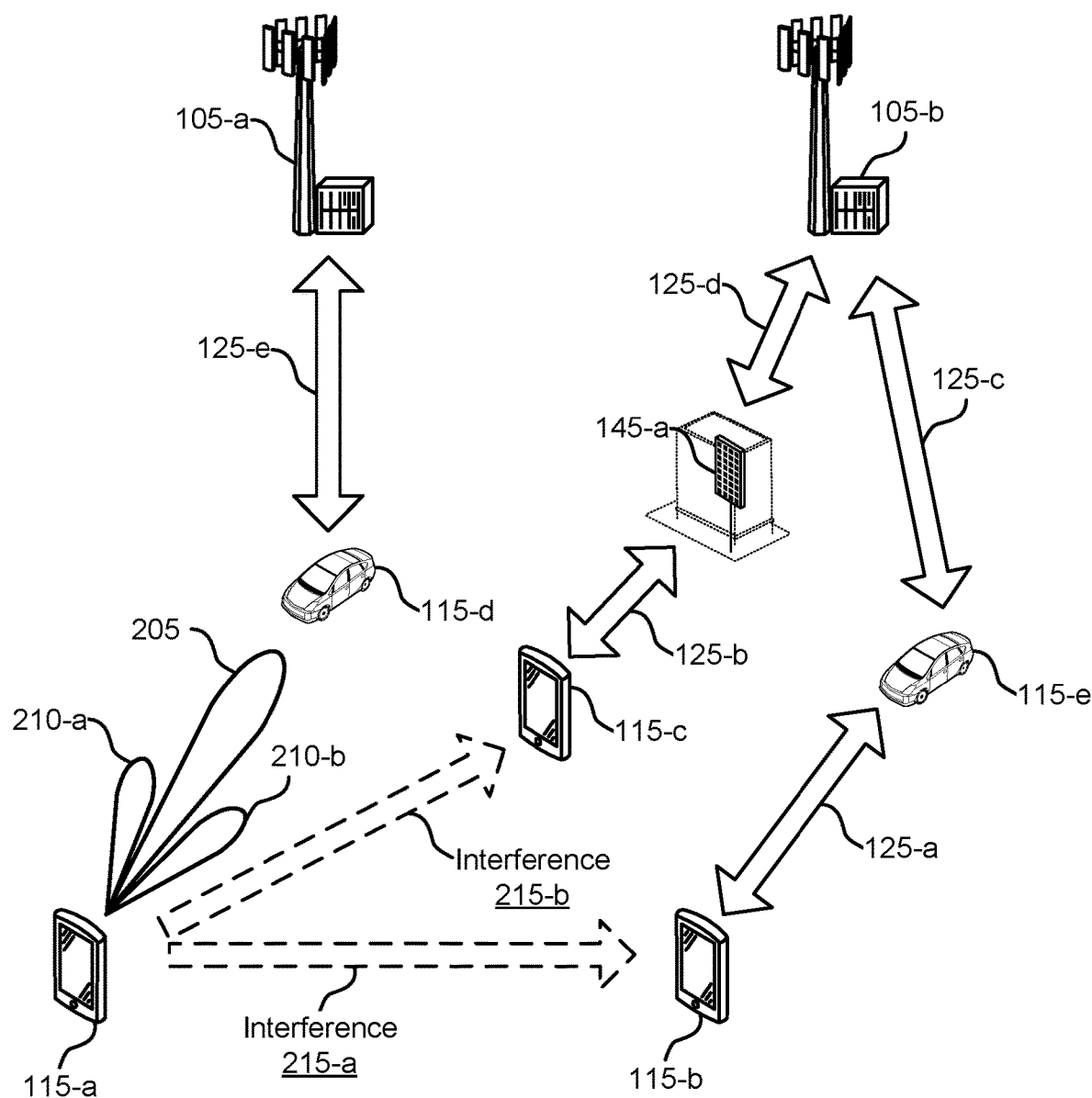
FIG. 2 illustrates an example of a wireless communications system that supports beam training in large bandwidth mmW systems in accordance with aspects of the present disclosure.

FIG. 2 illustrates an example of a wireless communications system 200 that supports beam training in large bandwidth mmW systems in accordance with aspects of the present disclosure. In some examples, the wireless communications system 200 may implement aspects of the wireless communications system 100. For example, the wireless communications system 200 may include one or more base stations 105 and UEs 115 (for example, cars, mobile devices, and additional UEs), which may be examples of corresponding base stations 105 and UEs 115 as described with reference to FIG. 1. As shown, the wireless communications system 200 may include a base station 105-a, a base station 105-b, a UE 115-a, a UE 115-b, a UE 115-c, a UE 115-d, and a UE 115-e. Additionally, the wireless communications system 200 may include an access network transmission entity 145-a that facilitates communications between a base station 105 and a UE 115 (for example, between the base station 105-b and the UE 115-c) and may include multiple communication links 125 for transmitting messages between the different wireless devices (for example, between two UEs 115, between a base station 105 and a UE 115, or between an access network transmission entity and a UE 115 or a base station 105).

The wireless communications system 200 supports beamforming for communications between devices. The wireless communications system 200 may use beamforming to improve link margin deteriorated due to path, penetration, and blockage losses. Devices may steer a beam over a set of specific direction(s) and may use beam scanning (for example, as part of a beam refinement procedure) to determine good (for example, optimal) beamforming weights to use to establish a communication link 125 between two devices. For example, a DFT beamforming weight may create a main side lobe at a gap (for example, about a 13.5 dB gap) from a peak array gain direction (that is, a main lobe signal strength or direction). As shown, the UE 115-a may transmit communications using beamformed transmissions that include at least a main lobe 205 (or a primary part of the beam or lobe) and one or more side lobes 210 (or secondary or side part of the beams) such as a side lobe 210-a and a side lobe 210-b. For example, the UE 115-a may transmit uplink data or messages to the base station 105-a via the UE 115-d using the main lobe 205 and the one or more side lobes 210, in which the UE 115-d relays the uplink data or messages to the base station 105-a. Additionally, the UEs 115 may change peak gain direction or side lobe directions (in general, the gain distribution). In some implementations, the UEs 115 may see gains in unintended directions for beamformed transmissions. For example, the UEs 115 may create one or more side lobes 210 at some angles as a consequence of the beam weights that are designed to steer energy via the main lobe 205 in a particular set of directions. However, the directions and amplitude of the one or more side lobes 210 may be unintended or change based on different characteristics of the device transmitting the beamformed transmissions.

Additionally, the wireless communications system 200 may support higher frequency ranges, such as FR2, FR3, FR4, or generally frequencies above 7.125 GHz. For example, operation over a "60 GHz" band may encompass coverage over a 57-71 GHz regime. Based on operating in these higher frequency ranges, devices in the wireless communications system 200 may use a large antenna array over a large or ultra-wide bandwidth. Antenna elements in these large antenna arrays may be spaced at a particular inter-element spacing for ultra-wideband operation. For example, if the inter-element spacing is 2.5 mm for a first frequency (in which 2.5=$\lambda/2$ for 60 GHz, in which $\lambda$ denotes wavelength, such that the inter-element spacing corresponds to half the wavelength for 60 GHz operation), then effects of inter-element spacing may depend on an actual frequency of operation for a device (for example, the inter-element spacing may create wavelengths, which may be 0.95*$\lambda/2$ at 57 GHz and 1.18*$\lambda/2$ at 71 GHz). For operations outside the higher frequency ranges (for example, operations outside the 57-71 GHz regime), interference in out-of-band scenarios may impact other devices (subject to effective isotropic sensitivity (EIS) constraints at a target node).

In some implementations, one or more UEs 115 in the wireless communications system 200 may use a 16×1 antenna array (for example, a large antenna array consisting of 16 antenna elements in a single row or column) for operations in a "60 GHz" band with a coverage area of the antenna array being ±60° around the boresight direction. If the inter-element spacing is 2.5 mm as described above for a first frequency (for example, 2.5=$\lambda/2$ for 60 GHz), then different characteristics associated with the inter-element spacing may depend on the frequency of operation, such that a wavelength associated with the inter-element spacing is 0.95*$\lambda/2$ at 57 GHz and 1.18*$\lambda/2$ at 71 GHz. As an example, the UE 115-a may transmit the main lobe 205, which may be pointing at a first angle (for example, 45°). Based on the first angle, an array gain may differ for different carrier frequencies. The UE 115-a may determine a set of beamforming weights for a particular carrier frequency (for example, 60 GHz) that may be mismatched to other carrier frequencies. Depending on which carrier frequency (and corresponding effects of inter-element spacing) another UE 115 or a node is operating in and the direction of the main lobe 205 (that is, the first angle) and direction relative to the source node (that is, the UE 115-a), the UE 115-a may see different interference and side lobe levels.

In some implementations, filters that create notches or suppress signals outside the band at which a device is operating may mitigate out-of-band spurs (that is, interferences from different frequency bands than those at which the device is operating). However, filters may be expensive, can consume a large amount of power and on-chip area, and different devices with different capabilities may suppress out-of-band signals in different ways. Additionally, in-band interference may be more problematic. For example, a number of devices may use frequencies between 59 and 61 GHz, so beamformed transmissions beyond these frequencies in the 57-71 GHz regime may be problematic and cause interference at nearby devices using the frequencies between 57 and 71 GHz. As shown, the beamformed transmissions from the UE 115-a may cause an interference 215 at nearby UEs 115. For example, the side lobe 210-b may cause an interference 215-a at the UE 115-b and an interference 215-b at the UE 115-c.

To mitigate the interference 215, the UE 115-a (for example, a source node) may perform a beam training procedure with nearby devices, such as the UE 115-b and the UE 115-c. During the beam training procedure, the UE 115-a (or a different device serving as a source node, such as a base station 105 or a customer premises equipment (CPE)) may first use different types of beams for downlink transmissions, uplink transmissions, or both at the carrier frequency of interest, in which the different types of beams correspond to beams with different characteristics, such as different peak gains and directions for the one or more side lobes 210. For example, the UE 115-a may transmit an uplink transmission to the base station 105-a (via the UE 115-d) using each type of beam from the different types of beams, such as transmitting a first instance of the uplink transmission on a first beam with a first set of characteristics, a second instance of the uplink transmission on a second beam with a second set of characteristics, and a third instance of the uplink transmission on a third beam with a third set of characteristics (up to a number of beams and instances configured for the beam training procedure). For the beam training procedure, after transmitting the uplink transmission to the base station 105-a using the different types of beams with different characteristics, the nearby devices (for example, the UE 115-b and the UE 115-c) may report which beams caused a higher amount or lesser amount of interference at the nearby devices as a result of the uplink transmissions the UE 115-a sent. A different device (for example, a base station 105) may transmit a downlink transmission using different beams with different characteristics to perform a similar beam training procedure to identify downlink transmissions that cause interference at nearby devices, and the nearby devices may indicate which beams caused a higher amount or lesser amount of interference at the nearby devices as a result of the downlink transmissions the different device sent.

These different beam types may have a same main lobe steering direction and main lobe beamwidth as well as comparable peak gains and gain distribution in the main lobe 205 (that is, main lobes within a threshold value). However, the different beam types may differ in terms of side lobe levels and interference profiles, such that the beam types refer to different transmit beams that have the different side lobe levels and interference profiles. The UE 115-a may determine sets of beamforming weights that may correspond to the different beam types in which each set of beamforming weights corresponds to a respective transmit beam of a set of transmit beams for the different beam types. For example, a single beamforming weight may be associated with a respective antenna element of an antenna array for a particular precoding for the UE 115-a. Subsequently, the UE 115-a may use a set of beamforming weights (for example, from multiple sets of beamforming weights) and a corresponding set of antenna elements for generating a single transmit beam of the set of transmit beams.

Each transmit beam of the set of transmit beams may then each have a same main lobe signal strength property (for example, a primary beam setting) to generate the same or similar main lobe 205 and one or more different side lobe signal strength properties (for example, different secondary beam settings) to generate different side lobes 210 than the other transmit beams of the set of transmit beams. In some implementations, the base station 105-a may preconfigure the sets of beamforming weights within the UE 115-a, a network device may signal the sets of beamforming weights to the UE 115-a, or the UE 115-a may determine the sets of beamforming weights in a different way based on an antenna array built into the UE 115-a.

After the UE 115-a uses the different types of beams for each of the uplink (or downlink) transmissions, other nodes (for example, target nodes, such as the UE 115-b and the UE 115-c, or other UEs 115 and CPEs) may report beam types that mitigate interference at the carrier frequencies of those other nodes. For example, each of these other nodes may report an indication of one or more sets of beamforming weights or an indication of the one or more corresponding transmit beams, or both, that the UE 115-a can use for subsequent communications to cause less interference at the other nodes. In some implementations, each of the other nodes may report a single set of beamforming weights/transmit beam for the UE 115-a to use for the subsequent communications, or may report multiple sets of beamforming weights/transmit beams for the UE 115-*a* to use for the subsequent communications. In some such implementations, the UE 115-*a* may rank the multiple sets of beamforming weights/transmit beams the other nodes report, for example, present in a ranked list of increasing likelihood of interference for the subsequent communications. Alternatively, the other nodes may report one or more sets of beamforming weights/transmit beams for the UE 115-*a* to not use for the subsequent communications based on those one or more sets of beamforming weights/transmit beams causing a higher level of interference at the other nodes.

In some implementations, the other nodes may report the indication of which sets of beamforming weights/transmit beams to use or not use directly to the UE 115-*a* (for example, via sidelink messaging if the other nodes are additional UEs 115 or via downlink messaging if the other nodes include the base stations 105). Additionally or alternatively, the other nodes may report the indication to a serving base station 105 of the respective node, which may then forward the indication directly to the UE 115-*a* or transmit the indication to an additional base station 105 serving the UE 115-*a* via a backhaul connection. In such examples, the additional base station 105 may then transmit the indication to the UE 115-*a*. For example, the UE 115-*b* and the UE 115-*c* may each transmit an indication of which sets of beamforming weights/transmit beams for the UE 115-*a* to use or not use directly to the UE 115-*a* or to the base station 105-*b* (for example, via the access network transmission entity 145-*a* and the UE 115-*e*, respectively). If transmitted to the base station 105-*b*, the base station 105-*b* may then transmit the indication to the UE 115-*a* directly, or may transmit the indication to the UE 115-*a* indirectly via the base station 105-*a* (for example, via a backhaul connection or via beamformed transmissions), which may then transmit the indication to the UE 115-*a* (for example, either directly or via the UE 115-*d*). Subsequently, the UE 115-*a* may then configure its antennas with an appropriate set of beamforming weights to generate a corresponding transmit beam for subsequent transmissions that results in less interference at the other nodes.

Additionally or alternatively, the other nodes may perform measurements on the different transmit beams. For example, these other nodes may measure a signal-to-noise ratio (SNR), signal-to-interference-plus-noise ratio (SINR), reference signal received power (RSRP), or a different power measurement for each of the different transmit beam. The other nodes may then report these power measurements to the UE 115-*a* (for example, directly or indirectly through one or more base stations 105 as described above), and the UE 115-*a* may then determine which sets of beamforming weights/transmit beams to use for the subsequent communications based on the reported measurements. Additionally or alternatively, if the measurements are reported to a base station 105, the base station 105 may determine one or more sets of beamforming weights/transmit beams for the UE 115-*a* to use for reducing the interference 215 and signal an indication of the determined sets of beamforming weights/transmit beams to the UE 115-*a* (for example, directly or indirectly through an additional base station 105).

Figure 3:
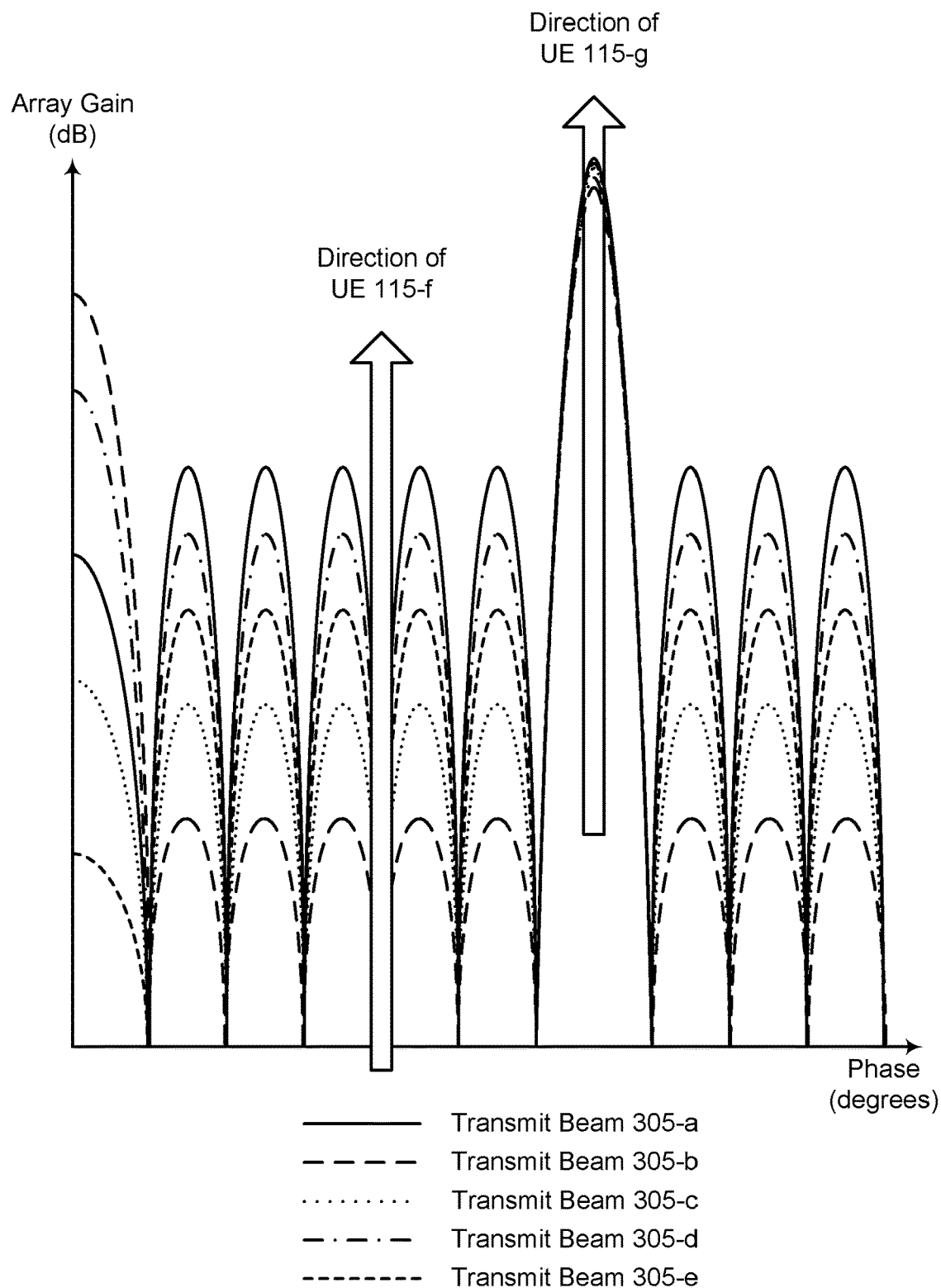
FIG. 3 illustrates an example of an antenna array gain that supports beam training in large bandwidth mmW systems in accordance with aspects of the present disclosure.

FIG. 3 illustrates an example of an antenna array gain 300 that supports beam training in large bandwidth mmW systems in accordance with aspects of the present disclosure. In some examples, the antenna array gain 300 may implement aspects of the wireless communications systems 100 and 200. For example, the antenna array gain 300 may represent different antenna array gains for different transmit beams 305 a source UE 115 transmits that have similar main lobes (for example, within a threshold range) but different side lobes. The source UE 115 may perform a beam training procedure with nearby UEs 115 to determine which transmit beams 305 cause a higher amount of interference at the nearby UEs 115 (or additional nearby devices). In some examples, the source UE 115 may operate at 60 GHz (UE60).

As part of the beam training procedure, the source UE 115 may use five beam types (that is, five different sets of beamforming weights that result in different interference profiles or levels for side lobes of a beamformed transmission) corresponding to five transmit beams 305 (that is, a transmit beam 305-*a*, a transmit beam 305-*b*, a transmit beam 305-*c*, a transmit beam 305-*d*, and a transmit beam 305-*e*) for uplink transmissions to a serving base station 105 at 60 GHz (gNB60). These five transmit beams may correspond to similar main lobe characteristics (that is, similar peak gain and direction) but with different side lobe levels at different angles. As an example, two other UEs 115 nearby the source UE 115 may operate at a different frequency (such as 71 GHz) that is within in-band operations of the source UE 115 (for example, within the 57-71 GHz regime). For example, a UE 115-*f* and a UE 115-*g* may receive downlink communications from an additional base station 105 that is also operating at the different frequency.

However, the uplink transmissions from the source UE 115 may interfere with reception of the downlink transmissions at the UE 115-*f* and the UE 115-*g* based on the side lobe directions of the uplink transmissions. As part of the beam training procedure, the UE 115-*f* and the UE 115-*g* may report information to enable the source UE 115 to reduce interference the uplink transmissions caused. For example, as described with reference to FIG. 2, the UE 115-*f* and the UE 115-*g* may report a single transmit beam 305 for the source UE 115 to use to mitigate or lessen the interference, multiple transmit beams 305 for the source UE 115 to use to mitigate or lessen the interference, or one or more transmit beams 305 for the source UE 115 to not use for subsequent communications. Additionally or alternatively, the UE 115-*f* and the UE 115-*g* may report different power or signal measurements for each of the transmit beams 305, and the source UE 115 may determine which transmit beam 305 to use based on the power/signal measurements. In some implementations, the UE 115-*f* and the UE 115-*g* may report the transmit beam(s) 305 for the source UE 115 to use or not use directly to the source UE 115 (for example, via sidelink messaging) or to the additional base station 105 that then transmits the indication to the source UE 115 (for example, directly or via the serving base station 105). The source UE 115 may then use the indicated or determined transmit beam(s) 305 for subsequent transmissions that mitigate interference to other UEs 115 and additional devices in the vicinity.

For example, as shown, the UE 115-*f* may indicate for the source UE 115 to use the transmit beam 305-*b* or the transmit beam 305-*c* for subsequent transmissions or communications based on the side lobes of a beamformed transmissions causing those transmit beams 305 to not have as high of an array gain. The UE 115-*f* may explicitly indicate the transmit beam 305-*b* alone, both the transmit beam 305-*b* and the transmit beam 305-*c* in a ranked list indicating that the transmit beam 305-*b* causes less interference than the transmit beam 305-*c*, indicate for the source UE 115 to not use the transmit beam 305-*a*, the transmit beam 305-*d*, or the transmit beam 305-*e*, or transmit power/signal measurements of each of the transmit beams 305 to report the indication. Additionally or alternatively, the UE 115-g may experience similar interference from the array gains the uplink communications from the source UE 115 cause. However, the UE 115-g may still report information on which transmit beams 305 cause less interference than the other transmit beams 305.

Figure 4:
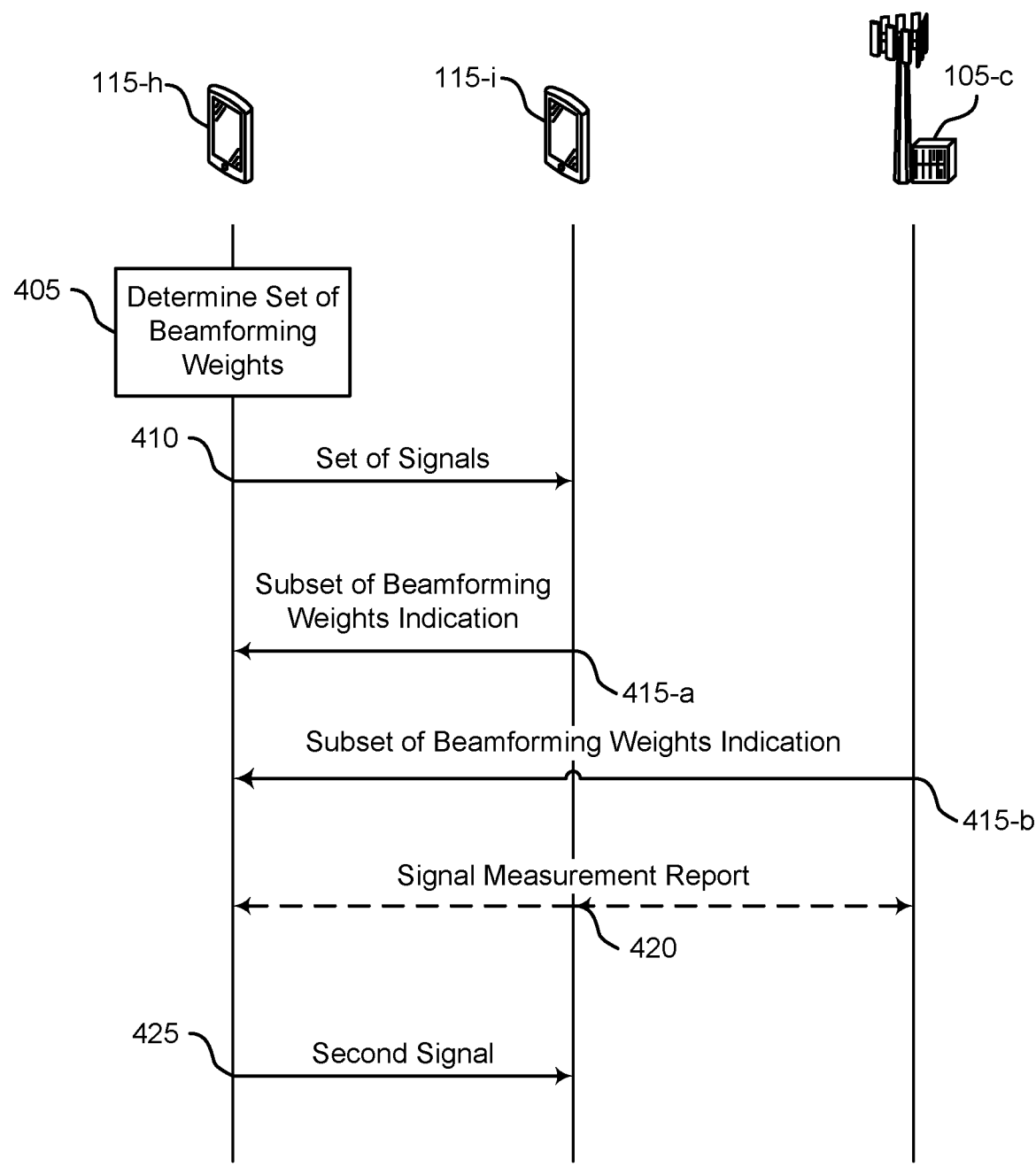
FIG. 4 illustrates an example of a process flow that supports beam training in large bandwidth mmW systems in accordance with aspects of the present disclosure.

FIG. 4 illustrates an example of a process flow 400 that supports beam training in large bandwidth mmW systems in accordance with aspects of the present disclosure. In some examples, the process flow 400 may implement aspects of the wireless communications systems 100 and 200. For example, the process flow 400 may include a base station 105-c, a UE 115-h, and a UE 115-i, which may be examples of corresponding base stations 105 and UEs 115, respectively, as described with reference to FIGS. 1-3. Additionally, the base station 105-c, the UE 115-h, and the UE 115-i may operate in a range of frequencies above 7.125 GHz.

In the following description of the process flow 400, the operations between the base station 105-c, the UE 115-h, and the UE 115-i may be transmitted in a different order than the order shown, or the operations performed by the base station 105-c, the UE 115-h, and the UE 115-i may be performed in different orders or at different times. Some operations may also be left out of the process flow 400, or other operations may be added to the process flow 400. While the base station 105-c, the UE 115-h, and the UE 115-i are shown performing a number of the operations of the process flow 400, any wireless device may perform the operations shown.

At 405, the UE 115-h may determine sets of beamforming weights for uplink communications, each set of the sets of beamforming weights corresponding to a respective transmit beam of a set of transmit beams, each transmit beam of the set of transmit beams having a same main lobe signal strength property as each other transmit beam of the set of transmit beams, and each transmit beam of the set of transmit beams further having one or more side lobe signal strength properties that are different than one or more side lobe signal strength properties of each of the other transmit beams of the set of transmit beams. For example, the same main lobe signal strength property may include one or more of a same peak beamforming array gain, a same peak beamforming array gain direction, a same main lobe beamwidth, or a same gain distribution of the main lobe. Additionally or alternatively, the same main lobe signal strength property for each transmit beam of the set of transmit beams may include a main lobe associated with each respective transmit beam being within a threshold signal strength of respective main lobes associated with each other transmit beam of the set of transmit beams.

At 410, the UE 115-h may transmit a set of signals, each signal of the set of signals transmitted on a respective transmit beam of the set of transmit beams. In some implementations, the UE 115-h may transmit the set of signals using each transmit beam of the set of transmit beams (for example, each transmit beam may correspond to a respective set of the sets of beamforming weights).

At 415, the UE 115-h may receive an indication of a subset of the sets of beamforming weights after transmitting the set of signals based on at least a first transmit beam of the set of transmit beams corresponding to a first set of beamforming weight of the sets of beamforming weights causing interference at the UE 115-i. For example, the subset of the sets of beamforming weights may be used by the UE 115-h for subsequent transmissions. Additionally, the UE 115-i may determine that one or more of the set of signals from the UE 115-h interfere with reception of a second signal at the UE 115-i. In some implementations, at 415-a, the UE 115-h may receive the indication of the subset of the sets of beamforming weights from the UE 115-i via a sidelink message. Additionally or alternatively, at 415-b, the UE 115-h may receive the indication of the subset of the sets of beamforming weights from the base station 105-c via a downlink message.

In some implementations, if receiving the indication of the subset of the sets of beamforming weights, the UE 115-h may receive an indication of an individual set of beamforming weights of the sets of beamforming weights to use for the subsequent transmissions. Additionally or alternatively, the UE 115-h may receive an indication of multiple sets of beamforming weights of the sets of beamforming weights to use for the subsequent transmissions. For example, the UE 115-h may rank the multiple sets of beamforming weights of the sets of beamforming weights in an order of increasing interference for the subsequent transmissions. Alternatively, the UE 115-h may receive an indication of one or more sets of beamforming weights of the sets of beamforming weights to not use for the subsequent transmissions.

Additionally or alternatively, at 420, the UE 115-h may receive a signal measurement report for each of the set of signals (for example, from the UE 115-i signaled directly to the UE 115-h or from the UE 115-i via the base station 105-c). Subsequently, the UE 115-h may determine a set of beamforming weights (for example, a second set of beamforming weights) to use for transmitting the subsequent transmissions (for example, a second signal) based on the signal measurement report. Additionally or alternatively, the base station 105-c may determine the set of beamforming weights for the UE 115-h to use for the subsequent transmissions based on the signal measurement report and indicate the beamforming weight to the UE 115-h. In some implementations, the signal measurement report may include one or more of an SNR, an SINR, an RSRP, a reference signal received quality (RSRQ), or a received signal strength indicator (RSSI).

At 425, the UE 115-h may transmit a second signal using a second set of beamforming weights of the sets of beamforming weights based on the indication received at 415. In some implementations, the subset of the sets of beamforming weights may include the second set of beamforming weights.

Figure 5:
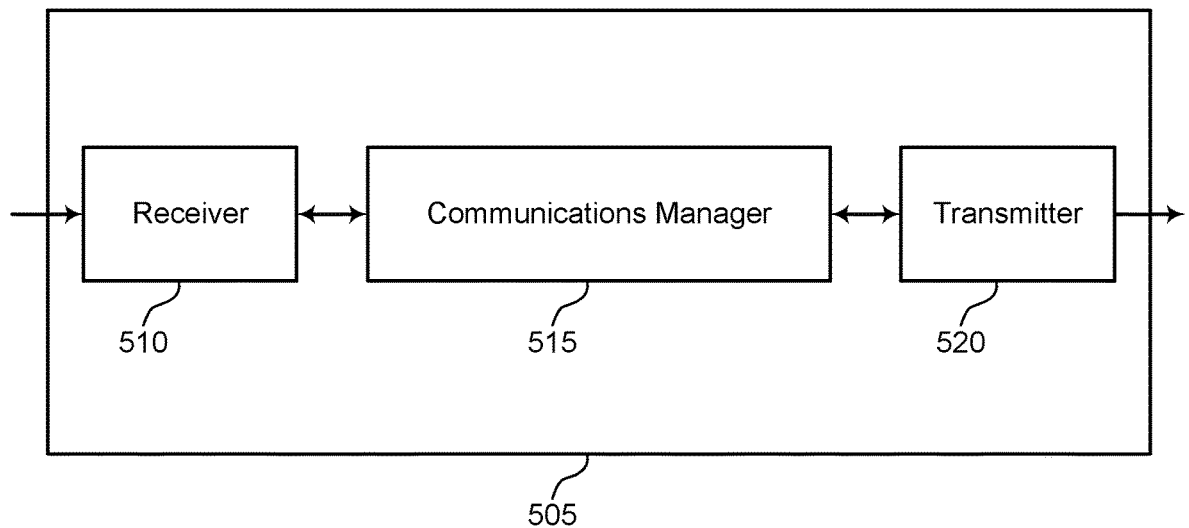
FIGS. 5 and 6 show block diagrams of devices that support beam training in large bandwidth mmW systems in accordance with aspects of the present disclosure.

FIG. 5 shows a block diagram of a device 505 that supports beam training in large bandwidth mmW systems in accordance with aspects of the present disclosure. The device 505 may be an example of aspects of a UE 115. The device 505 may include a receiver 510, a communications manager 515, and a transmitter 520. The communications manager 515 can be implemented, at least in part, by one or both of a modem and a processor. Each of these components may be in communication with one another (for example, via one or more buses).

The receiver 510 may receive information such as packets, user data, or control information associated with various information channels (for example, control channels, data channels, and information related to beam training in large bandwidth mmW systems). Information may be passed on to other components of the device 505. The receiver 510 may be an example of aspects of the transceiver 820 described with reference to FIG. 8. The receiver 510 may utilize a single antenna or a set of antennas.

The communications manager 515 may determine sets of beamforming weights for uplink communications, each set of the sets of beamforming weights corresponding to a respective transmit beam of a set of transmit beams, each transmit beam of the set of transmit beams having a same main lobe signal strength property as each other transmit beam of the set of transmit beams, and each transmit beam of the set of transmit beams further having one or more side lobe signal strength properties that are different than one or more side lobe signal strength properties of each of the other transmit beams of the set of transmit beams. In some implementations, the communications manager 515 may transmit a set of signals, each signal of the set of signals transmitted on a respective transmit beam of the set of transmit beams. Subsequently, the communications manager 515 may receive an indication of a subset of the sets of beamforming weights after transmitting the set of signals based on at least a first transmit beam of the set of transmit beams corresponding to a first set of beamforming weight of the sets of beamforming weights causing interference at a second UE. The communications manager 515 may then transmit a second signal using a second set of beamforming weights of the sets of beamforming weights based on the indication, the subset of the sets of beamforming weights including the second set of beamforming weights.

Additionally or alternatively, the communications manager 515 may receive, from a first UE, an indication of a training procedure to determine one or more sets of beamforming weights of sets of beamforming weights the first UE may use to transmit, each set of the sets of beamforming weights corresponding to a respective transmit beam of a set of transmit beams, each transmit beam of the set of transmit beams having a same main lobe signal strength property as each other transmit beam of the set of transmit beams, and each transmit beam of the set of transmit beams further having one or more side lobe signal strength properties that are different than one or more side lobe signal strength properties of each of the other transmit beams of the set of transmit beams. Additionally, the communications manager 515 may receive, from the first UE, a set of signals, each signal of the set of signals received from a respective transmit beam of the set of transmit beams. In some implementations, the communications manager 515 may determine that one or more of the set of signals from the first UE interfere with reception of a second signal at the UE. Subsequently, the communications manager 515 may transmit, based on the determining, an indication of a subset of the sets of beamforming weights related to subsequent transmissions by the first UE.

In some examples, the communications manager 515 may be implemented to realize one or more potential advantages for a UE 115. For example, by determining which sets of beamforming weights and transmit beams cause interference at nearby UEs 115 to the UE 115, the UE 115 may transmit subsequent signals such that the interferences at the nearby UEs 115 is mitigated or lessened. As such, the nearby UEs 115 may have more efficient power usage by reducing the use of retransmissions for downlink transmissions previously affected by the interference.

The transmitter 520 may transmit signals generated by other components of the device 505. In some examples, the transmitter 520 may be collocated with a receiver 510 in a transceiver component. For example, the transmitter 520 may be an example of aspects of the transceiver 820 described with reference to FIG. 8. The transmitter 520 may utilize a single antenna or a set of antennas.

Figure 6:
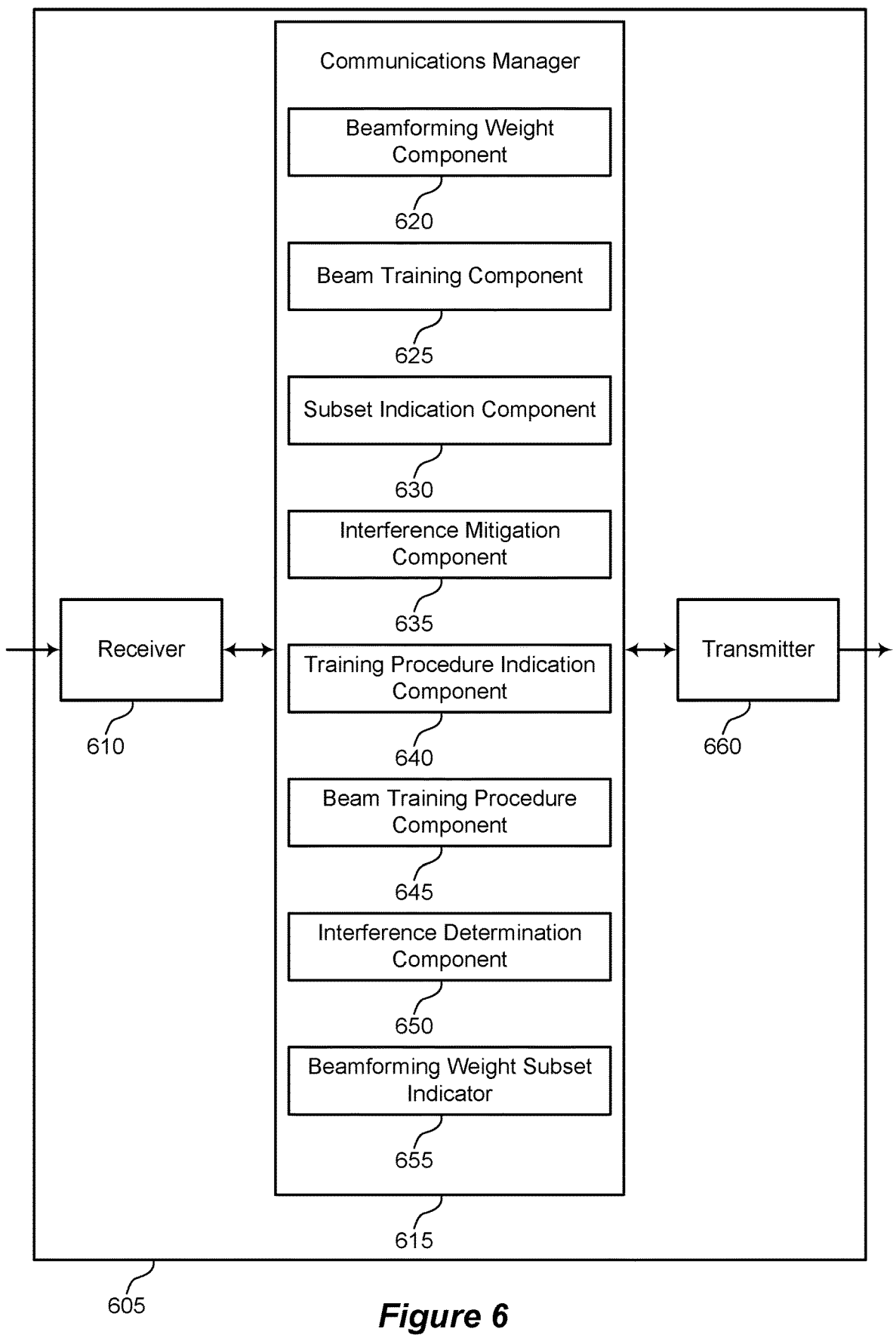

FIG. 6 shows a block diagram of a device 605 that supports beam training in large bandwidth mmW systems in accordance with aspects of the present disclosure. The device 605 may be an example of aspects of a device 505, or a UE 115. The device 605 may include a receiver 610, a communications manager 615, and a transmitter 660. The communications manager 615 can be implemented, at least in part, by one or both of a modem and a processor. Each of these components may be in communication with one another (for example, via one or more buses).

The receiver 610 may receive information such as packets, user data, or control information associated with various information channels (for example, control channels, data channels, and information related to beam training in large bandwidth mmW systems). Information may be passed on to other components of the device 605. The receiver 610 may be an example of aspects of the transceiver 820 described with reference to FIG. 8. The receiver 610 may utilize a single antenna or a set of antennas.

The communications manager 615 may include a beamforming weight component 620, a beam training component 625, a subset indication component 630, an interference mitigation component 635, a training procedure indication component 640, a beam training procedure component 645, an interference determination component 650, and a beamforming weight subset indicator 655.

The beamforming weight component 620 may determine sets of beamforming weights for uplink communications, each set of the sets of beamforming weights corresponding to a respective transmit beam of a set of transmit beams, each transmit beam of the set of transmit beams having a same main lobe signal strength property as each other transmit beam of the set of transmit beams, and each transmit beam of the set of transmit beams further having one or more side lobe signal strength properties that are different than one or more side lobe signal strength properties of each of the other transmit beams of the set of transmit beams.

The beam training component 625 may transmit a set of signals, each signal of the set of signals transmitted on a respective transmit beam of the set of transmit beams.

The subset indication component 630 may receive an indication of a subset of the sets of beamforming weights after transmitting the set of signals based on at least a first transmit beam of the set of transmit beams corresponding to a first set of beamforming weight of the sets of beamforming weights causing interference at a second UE.

The interference mitigation component 635 may transmit a second signal using a second set of beamforming weights of the sets of beamforming weights based on the indication, the subset of the sets of beamforming weights including the second set of beamforming weights.

The training procedure indication component 640 may receive, from a first UE, an indication of a training procedure to determine one or more sets of beamforming weights of sets of beamforming weights the first UE may use to transmit, each set of the sets of beamforming weights corresponding to a respective transmit beam of a set of transmit beams, each transmit beam of the set of transmit beams having a same main lobe signal strength property as each other transmit beam of the set of transmit beams, and each transmit beam of the set of transmit beams further having one or more side lobe signal strength properties that are different than one or more side lobe signal strength properties of each of the other transmit beams of the set of transmit beams.

The beam training procedure component 645 may receive, from the first UE, a set of signals, each signal of the set of signals received from a respective transmit beam of the set of transmit beams.

The interference determination component 650 may determine that one or more of the set of signals from the first UE interfere with reception of a second signal at the UE.

The beamforming weight subset indicator 655 may transmit, based on the determining, an indication of a subset of the sets of beamforming weights related to subsequent transmissions by the first UE.

Based on techniques for receiving an indication of a subset of beamforming weights, a processor of a UE 115 (for example, controlling the receiver 610, the transmitter 660, or the transceiver 820 as described with reference to FIG. 8) may more efficiently determine sets of beamforming weights and transmit beams to use that cause less interference at nearby UEs 115. As such, the processor of the UE 115 may reduce power usage at the nearby UEs 115 by reducing interference at those nearby UEs 115.

The transmitter 660 may transmit signals generated by other components of the device 605. In some examples, the transmitter 660 may be collocated with a receiver 610 in a transceiver component. For example, the transmitter 660 may be an example of aspects of the transceiver 820 described with reference to FIG. 8. The transmitter 660 may utilize a single antenna or a set of antennas.

Figure 7:
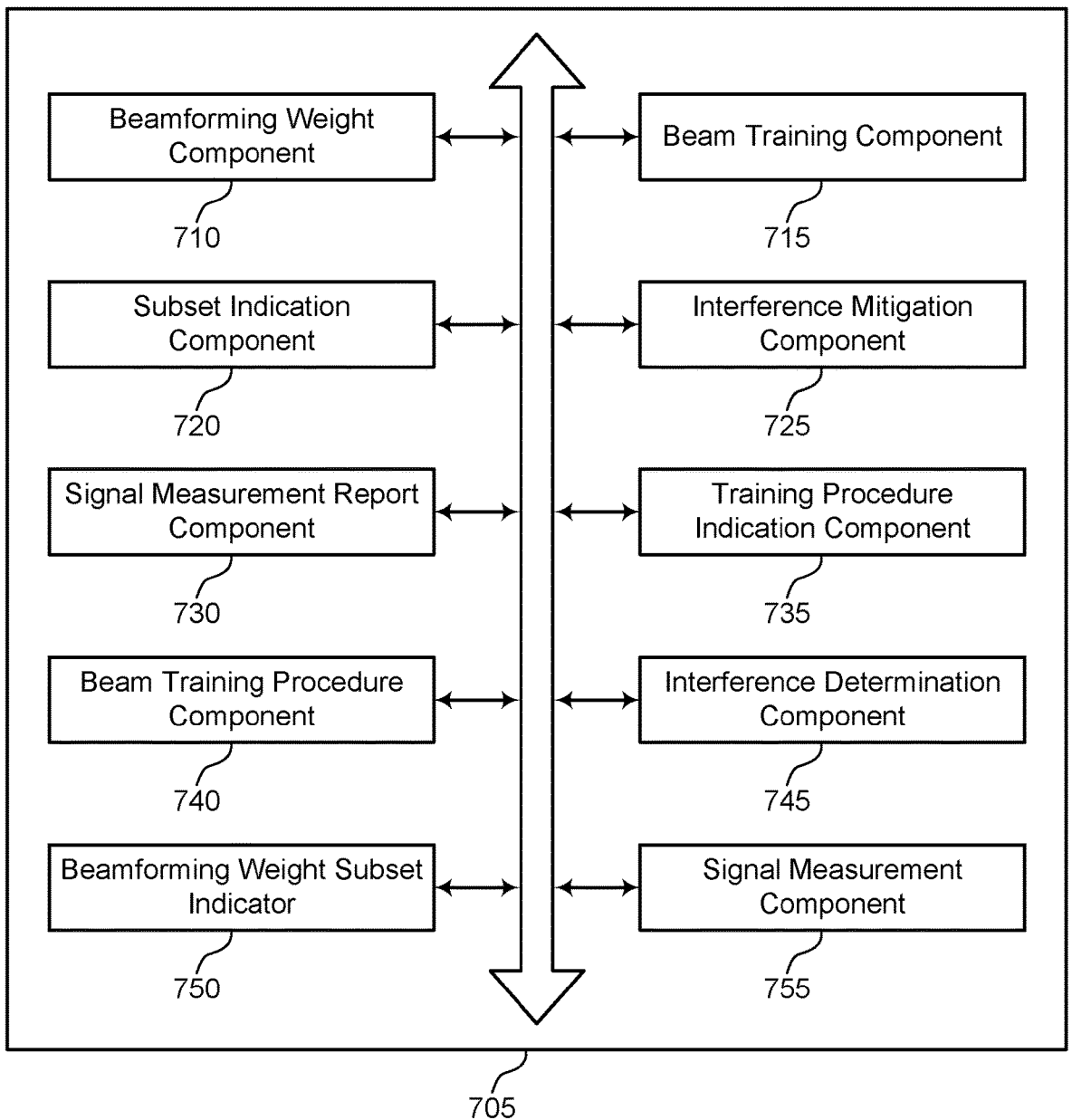
FIG. 7 shows a block diagram of a communications manager that supports beam training in large bandwidth mmW systems in accordance with aspects of the present disclosure.

FIG. 7 shows a block diagram of a communications manager 705 that supports beam training in large bandwidth mmW systems in accordance with aspects of the present disclosure. The communications manager 705 may be an example of aspects of a communications manager 515, a communications manager 615, or a communications manager 810 described herein. The communications manager 705 may include a beamforming weight component 710, a beam training component 715, a subset indication component 720, an interference mitigation component 725, a signal measurement report component 730, a training procedure indication component 735, a beam training procedure component 740, an interference determination component 745, a beamforming weight subset indicator 750, and a signal measurement component 755. Each of these components may communicate, directly or indirectly, with one another (for example, via one or more buses).

The beamforming weight component 710 may determine sets of beamforming weights for uplink communications, each set of the sets of beamforming weights corresponding to a respective transmit beam of a set of transmit beams, each transmit beam of the set of transmit beams having a same main lobe signal strength property as each other transmit beam of the set of transmit beams, and each transmit beam of the set of transmit beams further having one or more side lobe signal strength properties that are different than one or more side lobe signal strength properties of each of the other transmit beams of the set of transmit beams. In some examples, the same main lobe signal strength property for each transmit beam of the set of transmit beams may include a main lobe associated with each respective transmit beam being within a threshold signal strength of respective main lobes associated with each other transmit beam of the set of transmit beams. In some implementations, the same main lobe signal strength property may include one or more of a same peak beamforming array gain, a same peak beamforming array gain direction, a same main lobe beamwidth, or a same gain distribution of the main lobe. In some implementations, the first UE and the second UE may operate in a range of frequencies above 7.125 GHz.

The beam training component 715 may transmit a set of signals, each signal of the set of signals transmitted on a respective transmit beam of the set of transmit beams. In some examples, the beam training component 715 may transmit the set of signals using each transmit beam of the set of transmit beams.

The subset indication component 720 may be an indication of a subset of the sets of beamforming weights after transmitting the set of signals based on at least a first transmit beam of the set of transmit beams corresponding to a first set of beamforming weight of the sets of beamforming weights causing interference at a second UE. In some examples, the subset indication component 720 may receive an indication of an individual set of beamforming weights of the sets of beamforming weights to use for subsequent transmissions. In some examples, the subset indication component 720 may receive an indication of multiple sets of beamforming weights of the sets of beamforming weights to use for subsequent transmissions. In some implementations, the multiple sets of beamforming weights of the sets of beamforming weights are ranked in an order of increasing interference for the subsequent transmissions. In some examples, the subset indication component 720 may receive an indication of one or more sets of beamforming weights of the sets of beamforming weights to not use for the subsequent transmissions.

In some examples, the subset indication component 720 may receive the indication of the subset of the sets of beamforming weights from the second UE via a sidelink message. Additionally or alternatively, the subset indication component 720 may receive the indication of the subset of the sets of beamforming weights from a base station via a downlink message.

The interference mitigation component 725 may transmit a second signal using a second set of beamforming weights of the sets of beamforming weights based on the indication, the subset of the sets of beamforming weights including the second set of beamforming weights.

The training procedure indication component 735 may receive, from a first UE, an indication of a training procedure to determine one or more sets of beamforming weights of sets of beamforming weights the first UE may use to transmit, each set of the sets of beamforming weights corresponding to a respective transmit beam of a set of transmit beams, each transmit beam of the set of transmit beams having a same main lobe signal strength property as each other transmit beam of the set of transmit beams, and each transmit beam of the set of transmit beams further having one or more side lobe signal strength properties that are different than one or more side lobe signal strength properties of each of the other transmit beams of the set of transmit beams.

The beam training procedure component 740 may receive, from the first UE, a set of signals, each signal of the set of signals received from a respective transmit beam of the set of transmit beams. In some examples, the beam training procedure component 740 may receive the set of signals based on each set of the sets of beamforming weights.

The interference determination component 745 may determine that one or more of the set of signals from the first UE interfere with reception of a second signal at the UE. In some implementations, the second signal may include an uplink message from a base station, a sidelink message from an additional UE, or both.

The beamforming weight subset indicator 750 may transmit, based on the determining, an indication of a subset of the sets of beamforming weights related to subsequent transmissions by the first UE. In some examples, the beamforming weight subset indicator 750 may transmit an indication of an individual set of beamforming weights of the sets of beamforming weights to use for subsequent transmissions by the first UE. In some examples, the beamforming weight subset indicator 750 may transmit an indication of multiple sets of beamforming weights of the sets of beamforming weights to use for subsequent transmissions by the first UE. In some implementations, the multiple sets of beamforming weights of the sets of beamforming weights are ranked in an order of increasing interference for the subsequent transmissions. In some examples, the beamforming weight subset indicator 750 may transmit an indication of one or more sets of beamforming weights of the sets of beamforming weights to not use for the subsequent transmissions by the first UE.

In some examples, the beamforming weight subset indicator 750 may transmit the indication of the subset of the sets of beamforming weights to the first UE via a sidelink message. Additionally or alternatively, the beamforming weight subset indicator 750 may transmit the indication of the subset of the sets of beamforming weights to a base station via an uplink message.

The signal measurement report component 730 may receive a signal measurement report for each of the set of signals. In some examples, the signal measurement report component 730 may determine to use the second set of beamforming weights for transmitting the second signal based on the signal measurement report. In some implementations, the signal measurement report may include one or more of an SNR, an SINR, or an RSRP.

The signal measurement component 755 may transmit a signal measurement report for each of the set of signals, in which the subset of the sets of beamforming weights is indicated based on the signal measurement report. In some implementations, the signal measurement report may include one or more of an SNR, an SINR, or an RSRP.

Figure 8:
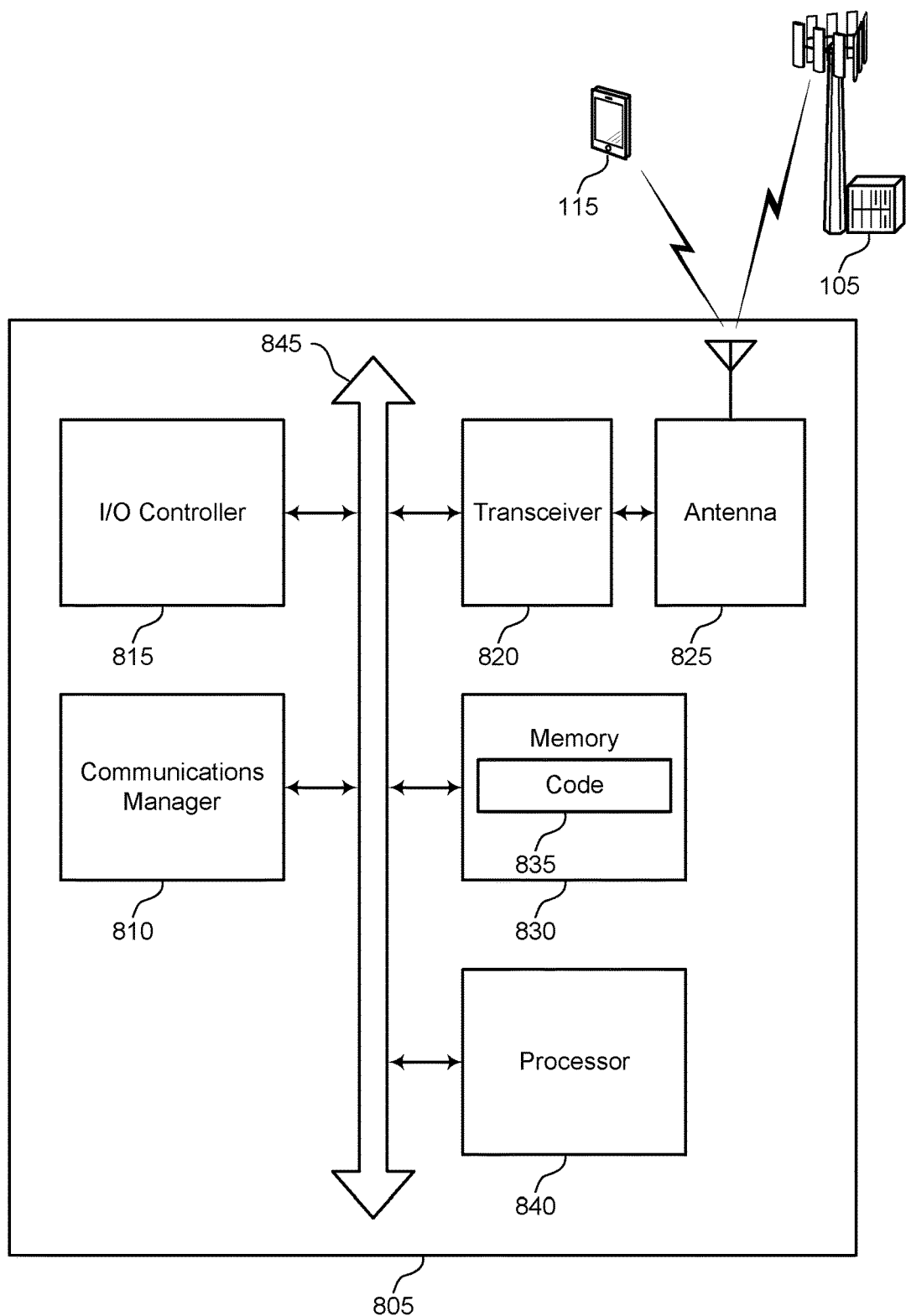
FIG. 8 shows a diagram of a system including a device that supports beam training in large bandwidth mmW systems in accordance with aspects of the present disclosure.

FIG. 8 shows a diagram of a system including a device 805 that supports beam training in large bandwidth mmW systems in accordance with aspects of the present disclosure. The device 805 may be an example of or include the components of device 505, device 605, or a UE 115. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (for example, bus 845).

The communications manager 810 may determine sets of beamforming weights for uplink communications, each set of the sets of beamforming weights corresponding to a respective transmit beam of a set of transmit beams, each transmit beam of the set of transmit beams having a same main lobe signal strength property as each other transmit beam of the set of transmit beams, and each transmit beam of the set of transmit beams further having one or more side lobe signal strength properties that are different than one or more side lobe signal strength properties of each of the other transmit beams of the set of transmit beams. Additionally, the communications manager 810 may transmit a set of signals, each signal of the set of signals transmitted on a respective transmit beam of the set of transmit beams. In some implementations, the communications manager 810 may receive an indication of a subset of the sets of beamforming weights after transmitting the set of signals based on at least a first transmit beam of the set of transmit beams corresponding to a first set of beamforming weight of the sets of beamforming weights causing interference at a second UE. Subsequently, the communications manager 810 may transmit a second signal using a second set of beamforming weights of the sets of beamforming weights based on the indication, the subset of the sets of beamforming weights including the second set of beamforming weights.

Additionally or alternatively, the communications manager 810 may receive, from a first UE, an indication of a training procedure to determine one or more sets of beamforming weights of sets of beamforming weights to be used by the first UE to transmit, each set of the sets of beamforming weights corresponding to a respective transmit beam of a set of transmit beams, each transmit beam of the set of transmit beams having a same main lobe signal strength property as each other transmit beam of the set of transmit beams, and each transmit beam of the set of transmit beams further having one or more side lobe signal strength properties that are different than one or more side lobe signal strength properties of each of the other transmit beams of the set of transmit beams. Additionally, the communications manager 810 may receive, from the first UE, a set of signals, each signal of the set of signals received from a respective transmit beam of the set of transmit beams. In some implementations, the communications manager 810 may determine that one or more of the set of signals from the first UE interfere with reception of a second signal at the UE. Subsequently, the communications manager 810 may transmit, based on the determining, an indication of a subset of the sets of beamforming weights related to subsequent transmissions by the first UE.

The I/O controller 815 may manage input and output signals for the device 805. The I/O controller 815 may also manage peripherals not integrated into the device 805. In some implementations, the I/O controller 815 may represent a physical connection or port to an external peripheral. In some implementations, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some implementations, the I/O controller 815 may be implemented as part of a processor. In some implementations, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some implementations, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, if executed, cause the processor to perform various functions described herein. In some implementations, the memory 830 may contain, among other things, a basic I/O system (BIOS) which may control basic hardware or software operation such as the interaction with peripheral components or devices.

The processor 840 may include an intelligent hardware device, (for example, one or more of a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, or a discrete hardware component). In some implementations, the processor 840 may be configured to operate a memory array using a memory controller. In other cases, a memory controller may be integrated into the processor 840. The processor 840 may be configured to execute computer-readable instructions stored in a memory (for example, the memory 830) to cause the device 805 to perform various functions (for example, functions or tasks supporting beam training in large bandwidth mmW systems).

The code 835 may include instructions to implement aspects of the present disclosure, including instructions to support wireless communications. The code 835 may be stored in a non-transitory computer-readable medium such as system memory or other type of memory. In some implementations, the code 835 may not be directly executable by the processor 840 but may cause a computer (for example, if compiled and executed) to perform functions described herein.

Figure 9:
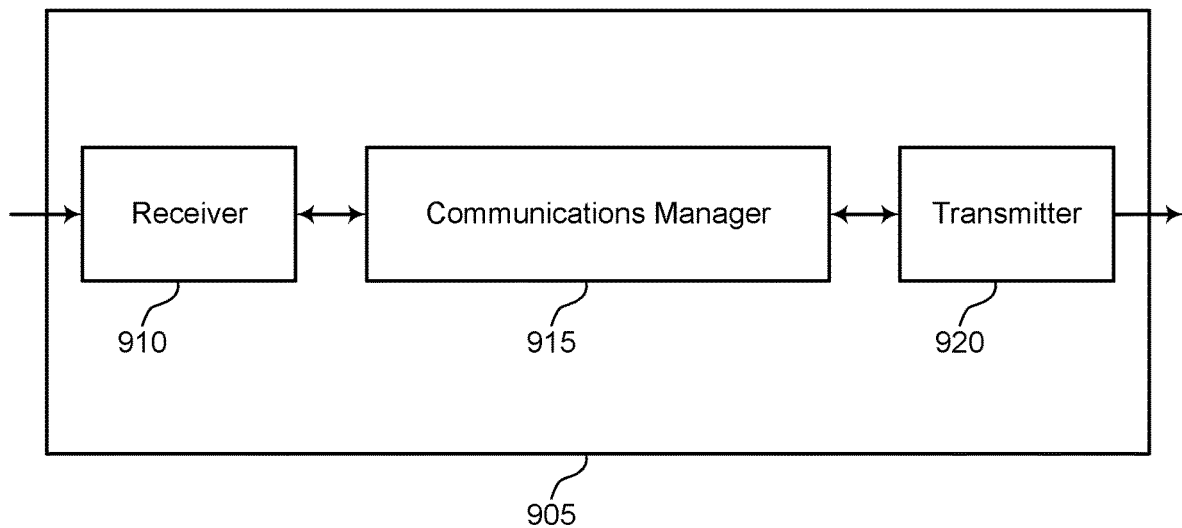
FIGS. 9 and 10 show block diagrams of devices that support beam training in large bandwidth mmW systems in accordance with aspects of the present disclosure.

FIG. 9 shows a block diagram of a device 905 that supports beam training in large bandwidth mmW systems in accordance with aspects of the present disclosure. The device 905 may be an example of aspects of a base station 105. The device 905 may include a receiver 910, a communications manager 915, and a transmitter 920. The communications manager 915 can be implemented, at least in part, by one or both of a modem and a processor. Each of these components may be in communication with one another (for example, via one or more buses).

The receiver 910 may receive information such as packets, user data, or control information associated with various information channels (for example, control channels, data channels, and information related to beam training in large bandwidth mmW systems). Information may be passed on to other components of the device 905. The receiver 910 may be an example of aspects of the transceiver 1220 described with reference to FIG. 12. The receiver 910 may utilize a single antenna or a set of antennas.

The communications manager 915 may establish a communication link with a UE. In some implementations, the communications manager 915 may receive, from the UE, an indication of a subset of sets of beamforming weights related to subsequent transmissions by a first UE based on a first set of beamforming weights of the sets of beamforming weights causing interference at the UE. Additionally, the communications manager 915 may transmit, to a device, the indication of the subset of sets of beamforming weights based on receiving the indication of the subset of sets of beamforming weights from the second UE.

The transmitter 920 may transmit signals generated by other components of the device 905. In some examples, the transmitter 920 may be collocated with a receiver 910 in a transceiver component. For example, the transmitter 920 may be an example of aspects of the transceiver 1220 described with reference to FIG. 12. The transmitter 920 may utilize a single antenna or a set of antennas.

Figure 10:
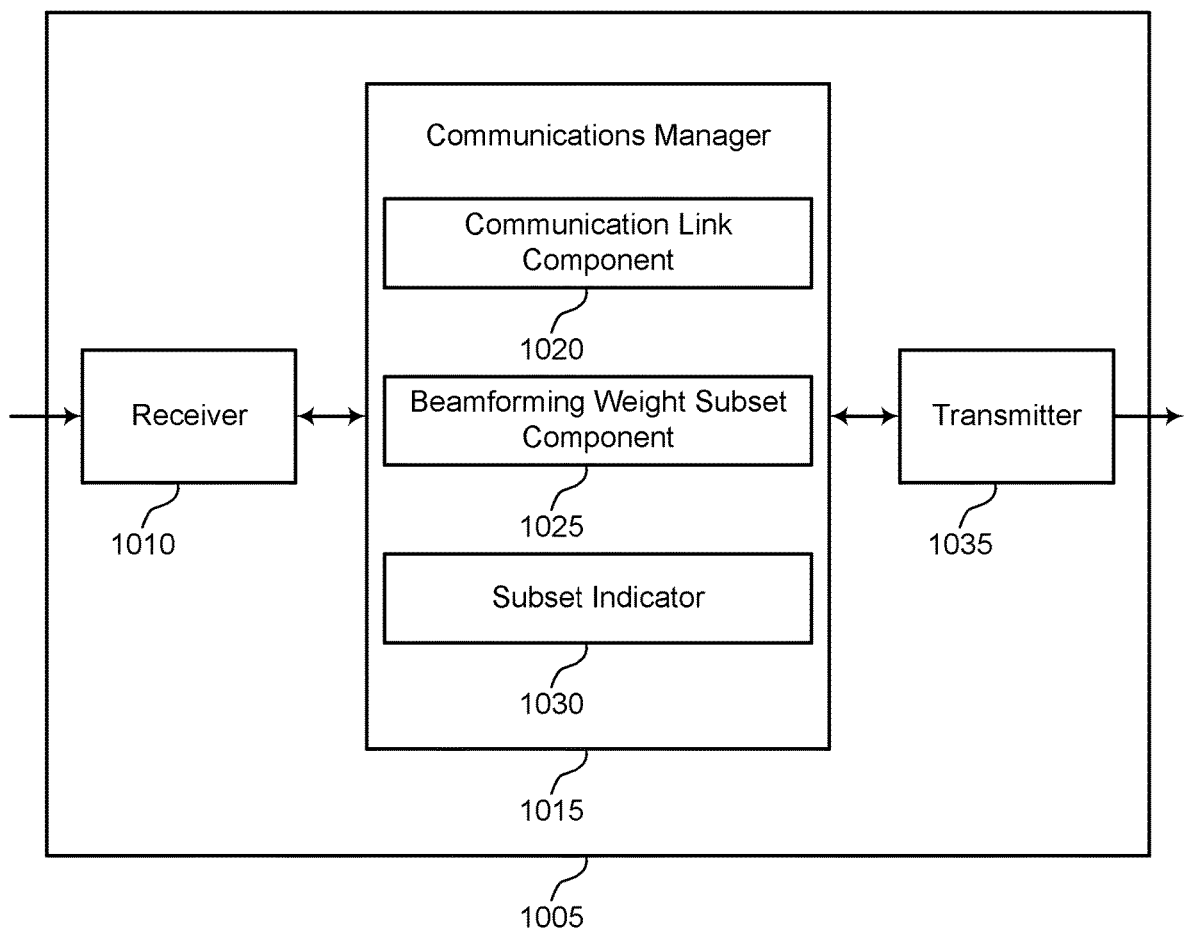

FIG. 10 shows a block diagram of a device 1005 that supports beam training in large bandwidth mmW systems in accordance with aspects of the present disclosure. The device 1005 may be an example of aspects of a device 905, or a base station 105. The device 1005 may include a receiver 1010, a communications manager 1015, and a transmitter 1035. The communications manager 1015 can be implemented, at least in part, by one or both of a modem and a processor. Each of these components may be in communication with one another (for example, via one or more buses).

The receiver 1010 may receive information such as packets, user data, or control information associated with various information channels (for example, control channels, data channels, and information related to beam training in large bandwidth mmW systems). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may include a communication link component 1020, a beamforming weight subset component 1025, and a subset indicator 1030.

The communication link component 1020 may establish a communication link with a UE. The beamforming weight subset component 1025 may receive, from the UE, an indication of a subset of sets of beamforming weights related to subsequent transmissions by a first UE based on a first set of beamforming weights of the sets of beamforming weights causing interference at the UE.

The subset indicator 1030 may transmit, to a device, the indication of the subset of sets of beamforming weights based on receiving the indication of the subset of sets of beamforming weights from the second UE.

The transmitter 1035 may transmit signals generated by other components of the device 1005. In some examples, the transmitter 1035 may be collocated with a receiver 1010 in a transceiver component. For example, the transmitter 1035 may be an example of aspects of the transceiver 1220 described with reference to FIG. 12. The transmitter 1035 may utilize a single antenna or a set of antennas.

Figure 11:
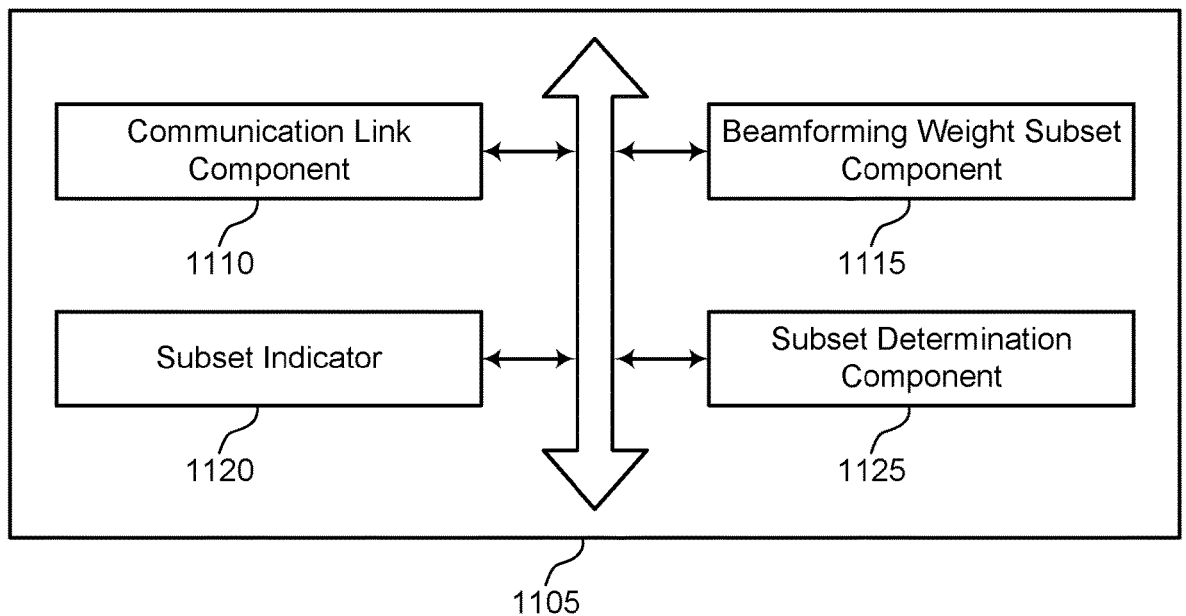
FIG. 11 shows a block diagram of a communications manager that supports beam training in large bandwidth mmW systems in accordance with aspects of the present disclosure.

FIG. 11 shows a block diagram of a communications manager 1105 that supports beam training in large bandwidth mmW systems in accordance with aspects of the present disclosure. The communications manager 1105 may be an example of aspects of a communications manager 915, a communications manager 1015, or a communications manager 1210 described herein. The communications manager 1105 may include a communication link component 1110, a beamforming weight subset component 1115, a subset indicator 1120, and a subset determination component 1125. Each of these components may communicate, directly or indirectly, with one another (for example, via one or more buses).

The communication link component 1110 may establish a communication link with a UE.

The beamforming weight subset component 1115 may receive, from the UE, an indication of a subset of sets of beamforming weights related to subsequent transmissions by a first UE based on a first set of beamforming weights of the sets of beamforming weights causing interference at the UE. In some implementations, each set of the sets of beamforming weights corresponds to a respective transmit beam of a set of transmit beams, each transmit beam of the set of transmit beams having a same main lobe signal strength property as each other transmit beam of the set of transmit beams, and each transmit beam of the set of transmit beams further having one or more side lobe signal strength properties that are different than one or more side lobe signal strength properties of each of the other transmit beams of the set of transmit beams. In some implementations, the base station, the first UE, and the UE may operate in a range of frequencies above 7.125 GHz.

The subset indicator 1120 may transmit, to a device, the indication of the subset of sets of beamforming weights based on receiving the indication of the subset of sets of beamforming weights from the second UE. In some examples, the subset indicator 1120 may transmit an indication of an individual set of beamforming weight of the sets of beamforming weights to use for subsequent transmissions by the first UE. In some examples, the subset indicator 1120 may transmit an indication of multiple sets of beamforming weights of the sets of beamforming weights to use for subsequent transmissions by the first UE. In some implementations, the multiple sets of beamforming weights of the sets of beamforming weights are ranked in an order of increasing interference for the subsequent transmissions. In some examples, the subset indicator 1120 may transmit an indication of one or more sets of beamforming weights of the sets of beamforming weights to not use for the subsequent transmissions by the first UE.

In some examples, the subset indicator 1120 may transmit the indication of the subset of sets of beamforming weights to a second base station to be transmitted to the first UE. Additionally or alternatively, the subset indicator 1120 may transmit the indication of the subset of sets of beamforming weights to the first UE.

The subset determination component 1125 may receive, from the UE, a signal measurement report for a set of signals transmitted by the first UE using the sets of beamforming weights. In some examples, the subset determination component 1125 may determine the subset of sets of beamforming weights related to the subsequent transmissions by the first UE based on the signal measurement report. In some implementations, the signal measurement report may include one or more of an SNR, an SINR, or an RSRP.

Figure 12:
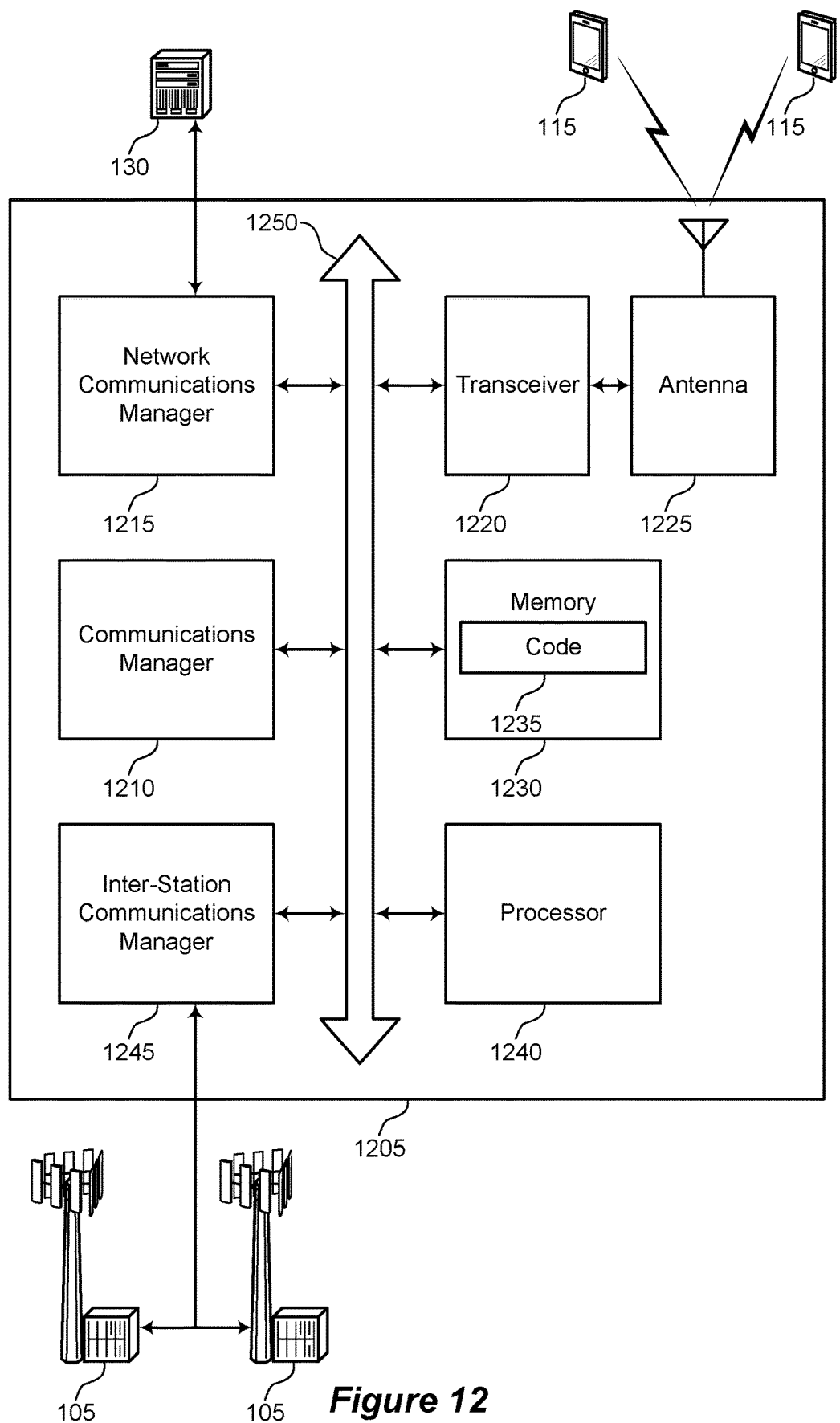
FIG. 12 shows a diagram of a system including a device that supports beam training in large bandwidth mmW systems in accordance with aspects of the present disclosure.

FIG. 12 shows a diagram of a system including a device 1205 that supports beam training in large bandwidth mmW systems in accordance with aspects of the present disclosure. The device 1205 may be an example of or include the components of device 905, device 1005, or a base station 105. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (for example, bus 1250).

The communications manager 1210 may establish a communication link with a UE. In some implementations, the communications manager 1210 may receive, from the UE, an indication of a subset of sets of beamforming weights related to subsequent transmissions by a first UE based on a first set of beamforming weights of the sets of beamforming weights causing interference at the UE. Additionally, the communications manager 1210 may transmit, to a device, the indication of the subset of sets of beamforming weights based on receiving the indication of the subset of sets of beamforming weights from the second UE.

The network communications manager 1215 may manage communications with the core network (for example, via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some implementations, the wireless device may include a single antenna 1225. However, in some cases the device may have more than one antenna 1225, which may be capable of concurrently transmitting or receiving multiple wireless transmissions.

The memory 1230 may include one or more of RAM or ROM. The memory 1230 may store computer-readable code 1235 including instructions that, if executed by a processor (for example, the processor 1240) cause the device to perform various functions described herein. In some implementations, the memory 1230 may contain, among other things, a BIOS which may control basic hardware or software operation such as the interaction with peripheral components or devices.

The processor 1240 may include an intelligent hardware device, (for example, one or more of a general-purpose processor, a DSP, a CPU, a microcontroller, an ASIC, an FPGA, a programmable logic device, a discrete gate or transistor logic component, or a discrete hardware component). In some implementations, the processor 1240 may be configured to operate a memory array using a memory controller. In some implementations, a memory controller may be integrated into processor 1240. The processor 1240 may be configured to execute computer-readable instructions stored in a memory (for example, the memory 1230) to cause the device 1205 to perform various functions (for example, functions or tasks supporting beam training in large bandwidth mmW systems).

The inter-station communications manager 1245 may manage communications with other base stations 105 and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between the base stations 105.

The code 1235 may include instructions to implement aspects of the present disclosure, including instructions to support wireless communications. The code 1235 may be stored in a non-transitory computer-readable medium such as system memory or other type of memory. In some implementations, the code 1235 may not be directly executable by the processor 1240 but may cause a computer (for example, if compiled and executed) to perform functions described herein.

Figure 13:
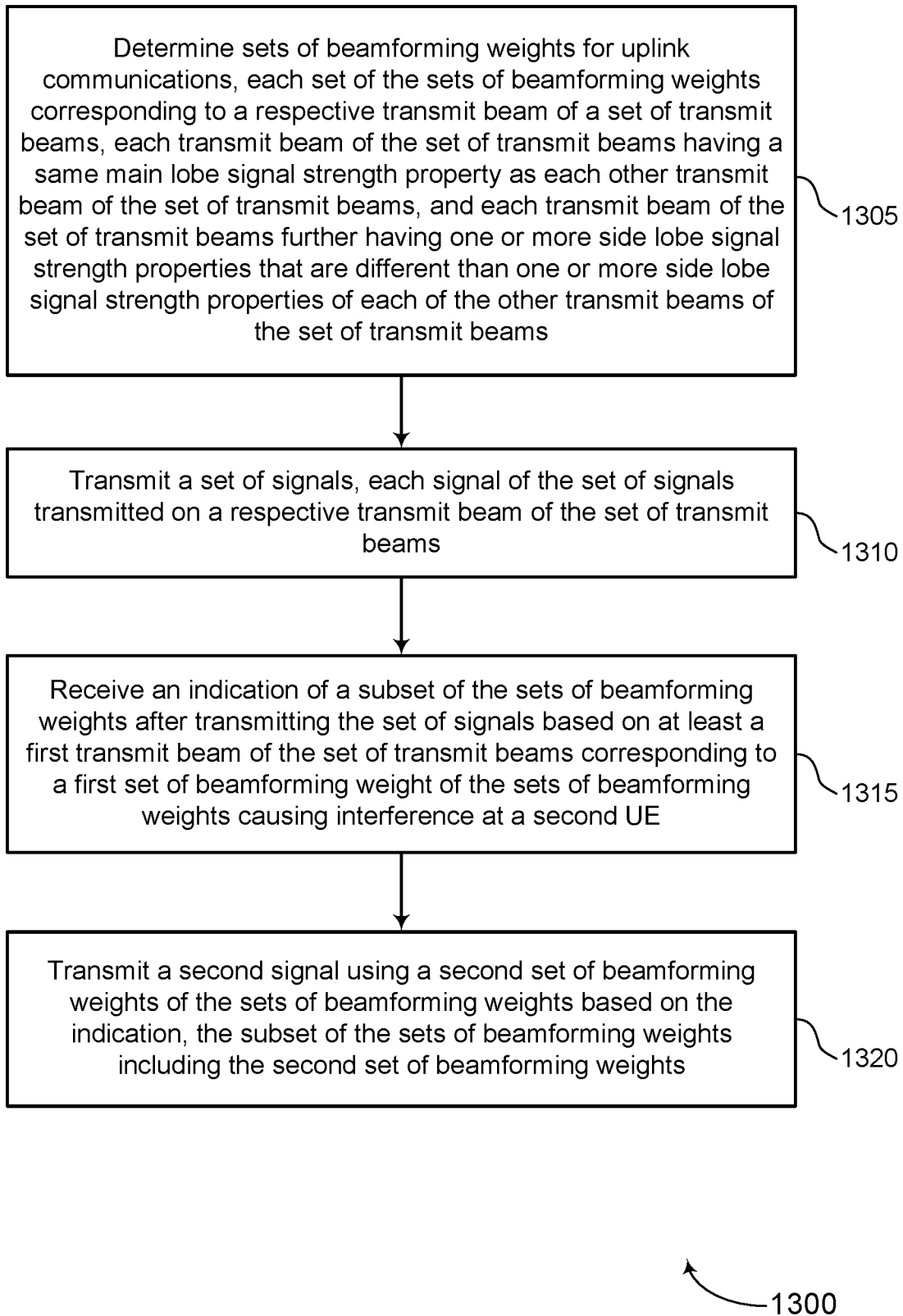
FIGS. 13-21 show flowcharts illustrating methods that support beam training in large bandwidth mmW systems in accordance with aspects of the present disclosure.

FIG. 13 shows a flowchart illustrating a method 1300 that supports beam training in large bandwidth mmW systems in accordance with aspects of the present disclosure. The operations of method 1300 may be implemented by a UE 115 or its components. For example, the operations of method 1300 may be performed by a communications manager as described with reference to FIGS. 5-8. In some examples, a UE may execute a set of instructions to control the functional elements of the UE to perform the functions described below. Additionally or alternatively, a UE may perform aspects of the functions described below using special-purpose hardware.

At 1305, the UE may determine sets of beamforming weights for uplink communications, each set of the sets of beamforming weights corresponding to a respective transmit beam of a set of transmit beams, each transmit beam of the set of transmit beams having a same main lobe signal strength property as each other transmit beam of the set of transmit beams, and each transmit beam of the set of transmit beams further having one or more side lobe signal strength properties that are different than one or more side lobe signal strength properties of each of the other transmit beams of the set of transmit beams. The operations of 1305 may be performed according to the methods described herein. In some examples, aspects of the operations of 1305 may be performed by a beamforming weight component as described with reference to FIGS. 5-8.

At 1310, the UE may transmit a set of signals, each signal of the set of signals transmitted on a respective transmit beam of the set of transmit beams. The operations of 1310 may be performed according to the methods described herein. In some examples, aspects of the operations of 1310 may be performed by a beam training component as described with reference to FIGS. 5-8.

At 1315, the UE may receive an indication of a subset of the sets of beamforming weights after transmitting the set of signals based on at least a first transmit beam of the set of transmit beams corresponding to a first set of beamforming weight of the sets of beamforming weights causing interference at a second UE. The operations of 1315 may be performed according to the methods described herein. In some examples, aspects of the operations of 1315 may be performed by a subset indication component as described with reference to FIGS. 5-8.

At 1320, the UE may transmit a second signal using a second set of beamforming weights of the sets of beamforming weights based on the indication, the subset of the sets of beamforming weights including the second set of beamforming weights. The operations of 1320 may be performed according to the methods described herein. In some examples, aspects of the operations of 1320 may be performed by an interference mitigation component as described with reference to FIGS. 5-8.

Figure 14:
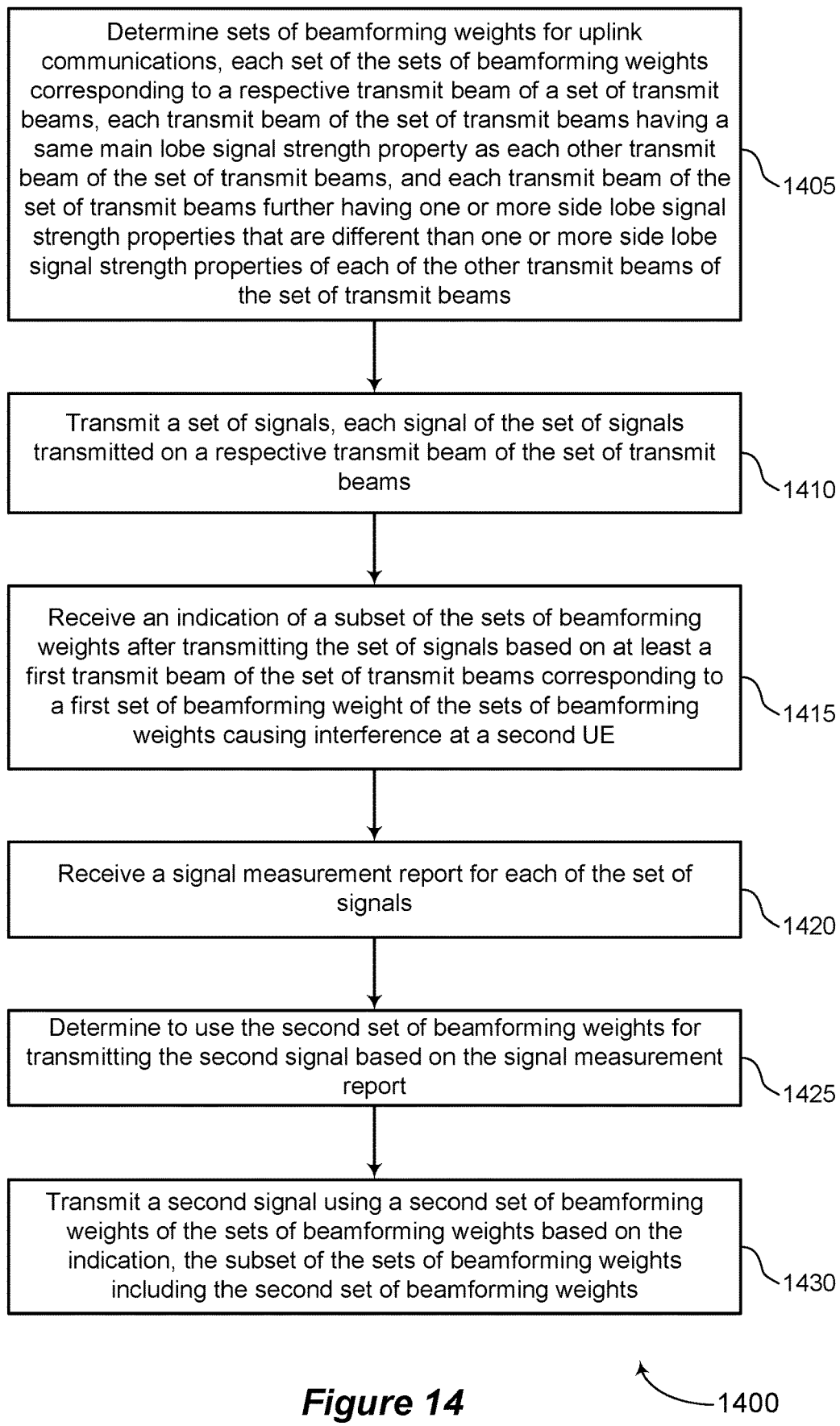

FIG. 14 shows a flowchart illustrating a method 1400 that supports beam training in large bandwidth mmW systems in accordance with aspects of the present disclosure. The operations of method 1400 may be implemented by a UE 115 or its components. For example, the operations of method 1400 may be performed by a communications manager as described with reference to FIGS. 5-8. In some examples, a UE may execute a set of instructions to control the functional elements of the UE to perform the functions described below. Additionally or alternatively, a UE may perform aspects of the functions described below using special-purpose hardware.

At 1405, the UE may determine sets of beamforming weights for uplink communications, each set of the sets of beamforming weights corresponding to a respective transmit beam of a set of transmit beams, each transmit beam of the set of transmit beams having a same main lobe signal strength property as each other transmit beam of the set of transmit beams, and each transmit beam of the set of transmit beams further having one or more side lobe signal strength properties that are different than one or more side lobe signal strength properties of each of the other transmit beams of the set of transmit beams. The operations of 1405 may be performed according to the methods described herein. In some examples, aspects of the operations of 1405 may be performed by a beamforming weight component as described with reference to FIGS. 5-8.

At 1410, the UE may transmit a set of signals, each signal of the set of signals transmitted on a respective transmit beam of the set of transmit beams. The operations of 1410 may be performed according to the methods described herein. In some examples, aspects of the operations of 1410 may be performed by a beam training component as described with reference to FIGS. 5-8.

At 1415, the UE may receive an indication of a subset of the sets of beamforming weights after transmitting the set of signals based on at least a first transmit beam of the set of transmit beams corresponding to a first set of beamforming weight of the sets of beamforming weights causing interference at a second UE. The operations of 1415 may be performed according to the methods described herein. In some examples, aspects of the operations of 1415 may be performed by a subset indication component as described with reference to FIGS. 5-8.

At 1420, the UE may receive a signal measurement report for each of the set of signals. The operations of 1420 may be performed according to the methods described herein. In some examples, aspects of the operations of 1420 may be performed by a signal measurement report component as described with reference to FIGS. 5-8.

At 1425, the UE may determine to use a second set of beamforming weights for transmitting a second signal based on the signal measurement report. The operations of 1425 may be performed according to the methods described herein. In some examples, aspects of the operations of 1425 may be performed by a signal measurement report component as described with reference to FIGS. 5-8.

At 1430, the UE may transmit the second signal using the second set of beamforming weights of the sets of beamforming weights based on the indication, the subset of the sets of beamforming weights including the second set of beamforming weights. The operations of 1430 may be performed according to the methods described herein. In some examples, aspects of the operations of 1430 may be performed by an interference mitigation component as described with reference to FIGS. 5-8.

Figure 15:
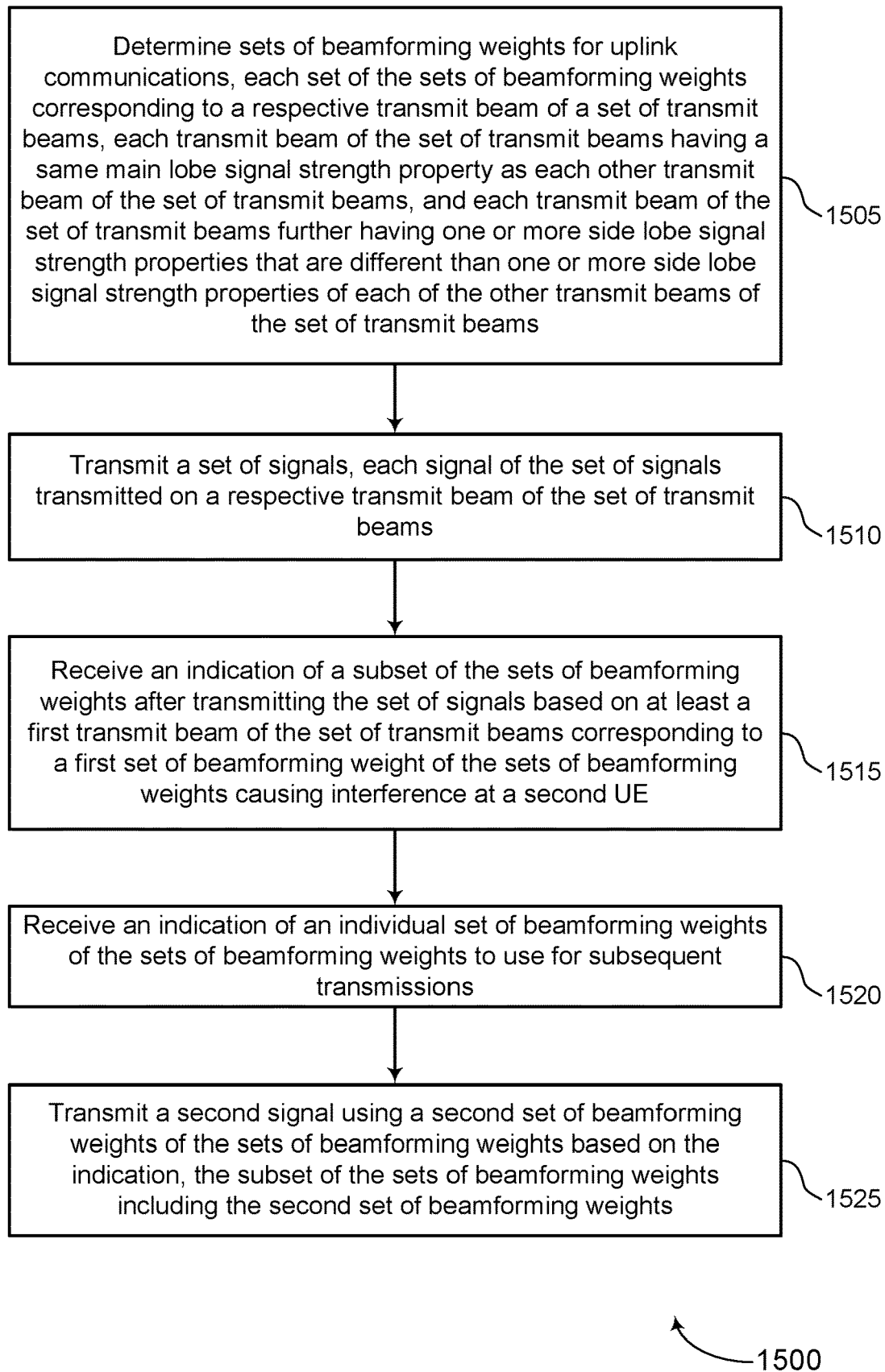

FIG. 15 shows a flowchart illustrating a method 1500 that supports beam training in large bandwidth mmW systems in accordance with aspects of the present disclosure. The operations of method 1500 may be implemented by a UE 115 or its components. For example, the operations of method 1500 may be performed by a communications manager as described with reference to FIGS. 5-8. In some examples, a UE may execute a set of instructions to control the functional elements of the UE to perform the functions described below. Additionally or alternatively, a UE may perform aspects of the functions described below using special-purpose hardware.

At 1505, the UE may determine sets of beamforming weights for uplink communications, each set of the sets of beamforming weights corresponding to a respective transmit beam of a set of transmit beams, each transmit beam of the set of transmit beams having a same main lobe signal strength property as each other transmit beam of the set of transmit beams, and each transmit beam of the set of transmit beams further having one or more side lobe signal strength properties that are different than one or more side lobe signal strength properties of each of the other transmit beams of the set of transmit beams. The operations of 1505 may be performed according to the methods described herein. In some examples, aspects of the operations of 1505 may be performed by a beamforming weight component as described with reference to FIGS. 5-8.

At 1510, the UE may transmit a set of signals, each signal of the set of signals transmitted on a respective transmit beam of the set of transmit beams. The operations of 1510 may be performed according to the methods described herein. In some examples, aspects of the operations of 1510 may be performed by a beam training component as described with reference to FIGS. 5-8.

At 1515, the UE may receive an indication of a subset of the sets of beamforming weights after transmitting the set of signals based on at least a first transmit beam of the set of transmit beams corresponding to a first set of beamforming weight of the sets of beamforming weights causing interference at a second UE. The operations of 1515 may be performed according to the methods described herein. In some examples, aspects of the operations of 1515 may be performed by a subset indication component as described with reference to FIGS. 5-8.

At 1520, the UE may receive an indication of an individual set of beamforming weights of the sets of beamforming weights to use for subsequent transmissions. The operations of 1520 may be performed according to the methods described herein. In some examples, aspects of the operations of 1520 may be performed by a subset indication component as described with reference to FIGS. 5-8.

At 1525, the UE may transmit a second signal using a second set of beamforming weights of the sets of beamforming weights based on the indication, the subset of the sets of beamforming weights including the second set of beamforming weights. The operations of 1525 may be performed according to the methods described herein. In some examples, aspects of the operations of 1525 may be performed by an interference mitigation component as described with reference to FIGS. 5-8.

Figure 16:
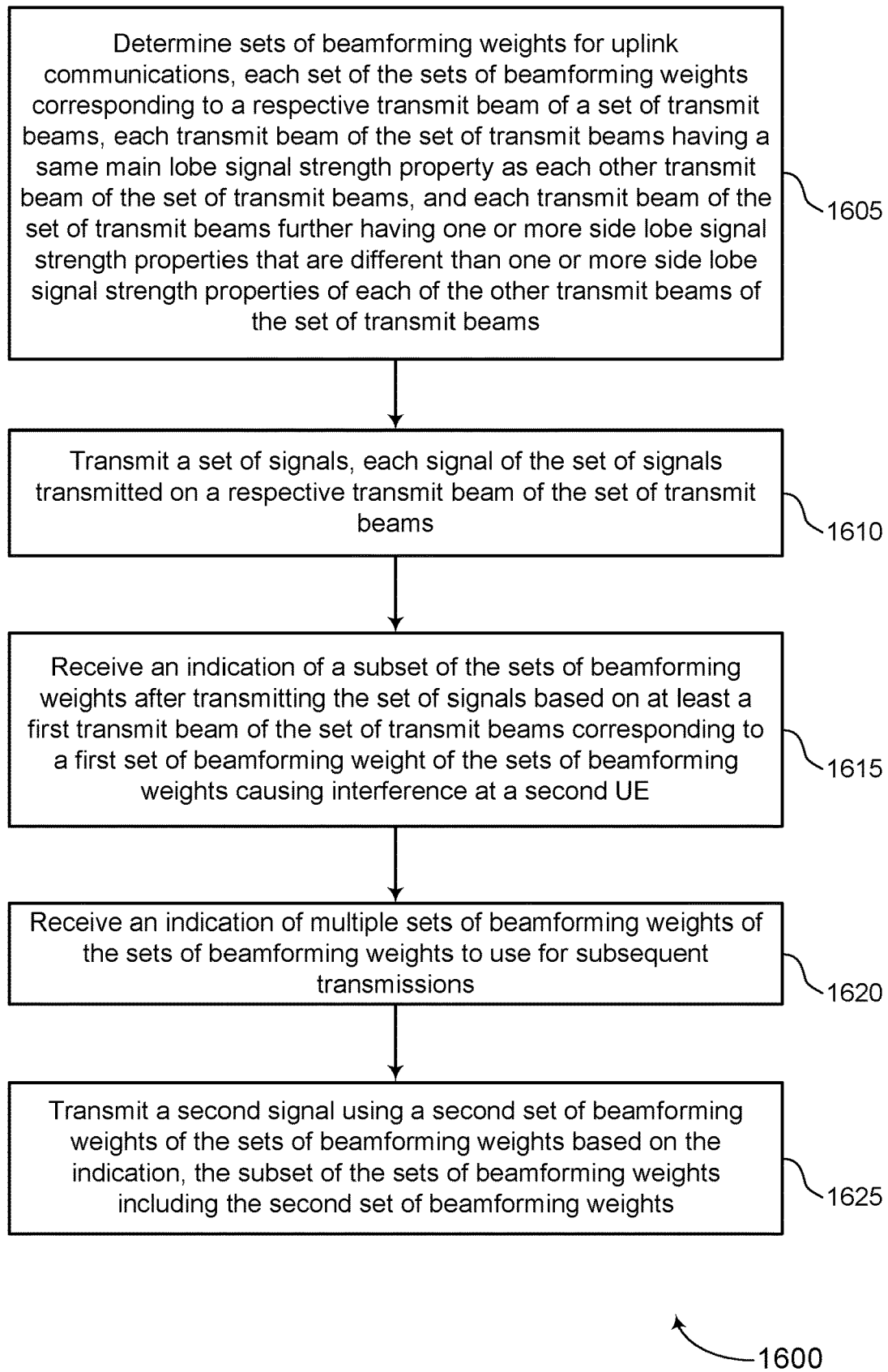

FIG. 16 shows a flowchart illustrating a method 1600 that supports beam training in large bandwidth mmW systems in accordance with aspects of the present disclosure. The operations of method 1600 may be implemented by a UE 115 or its components. For example, the operations of method 1600 may be performed by a communications manager as described with reference to FIGS. 5-8. In some examples, a UE may execute a set of instructions to control the functional elements of the UE to perform the functions described below. Additionally or alternatively, a UE may perform aspects of the functions described below using special-purpose hardware.

At 1605, the UE may determine sets of beamforming weights for uplink communications, each set of the sets of beamforming weights corresponding to a respective transmit beam of a set of transmit beams, each transmit beam of the set of transmit beams having a same main lobe signal strength property as each other transmit beam of the set of transmit beams, and each transmit beam of the set of transmit beams further having one or more side lobe signal strength properties that are different than one or more side lobe signal strength properties of each of the other transmit beams of the set of transmit beams. The operations of 1605 may be performed according to the methods described herein. In some examples, aspects of the operations of 1605 may be performed by a beamforming weight component as described with reference to FIGS. 5-8.

At 1610, the UE may transmit a set of signals, each signal of the set of signals transmitted on a respective transmit beam of the set of transmit beams. The operations of 1610 may be performed according to the methods described herein. In some examples, aspects of the operations of 1610 may be performed by a beam training component as described with reference to FIGS. 5-8.

At 1615, the UE may receive an indication of a subset of the sets of beamforming weights after transmitting the set of signals based on at least a first transmit beam of the set of transmit beams corresponding to a first set of beamforming weight of the sets of beamforming weights causing interference at a second UE. The operations of 1615 may be performed according to the methods described herein. In some examples, aspects of the operations of 1615 may be performed by a subset indication component as described with reference to FIGS. 5-8.

At 1620, the UE may receive an indication of multiple sets of beamforming weights of the sets of beamforming weights to use for subsequent transmissions. The operations of 1620 may be performed according to the methods described herein. In some examples, aspects of the operations of 1620 may be performed by a subset indication component as described with reference to FIGS. 5-8.

At 1625, the UE may transmit a second signal using a second set of beamforming weights of the sets of beamforming weights based on the indication, the subset of the sets of beamforming weights including the second set of beamforming weights. The operations of 1625 may be performed according to the methods described herein. In some examples, aspects of the operations of 1625 may be performed by an interference mitigation component as described with reference to FIGS. 5-8.

Figure 17:
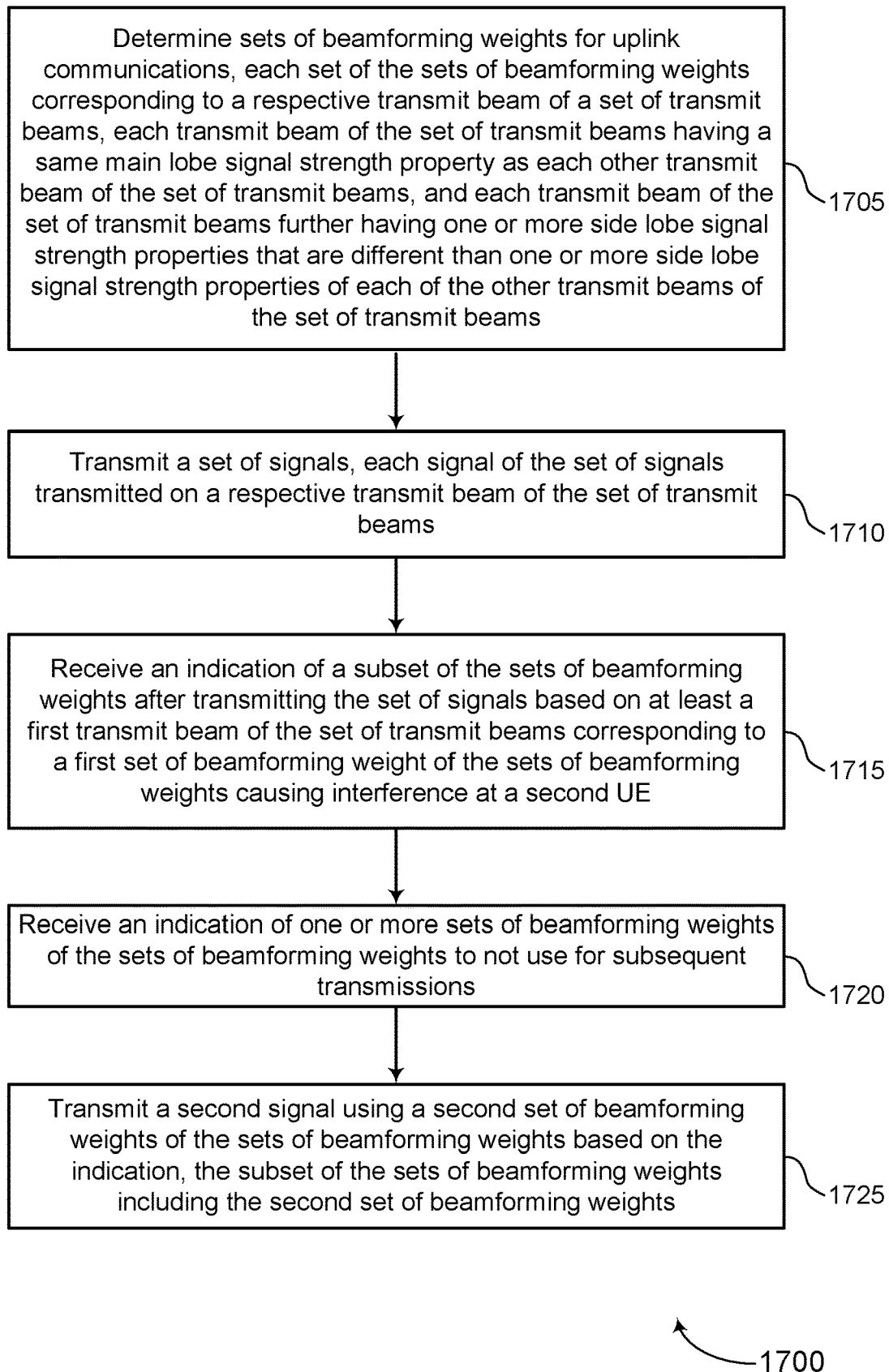

FIG. 17 shows a flowchart illustrating a method 1700 that supports beam training in large bandwidth mmW systems in accordance with aspects of the present disclosure. The operations of method 1700 may be implemented by a UE 115 or its components. For example, the operations of method 1700 may be performed by a communications manager as described with reference to FIGS. 5-8. In some examples, a UE may execute a set of instructions to control the functional elements of the UE to perform the functions described below. Additionally or alternatively, a UE may perform aspects of the functions described below using special-purpose hardware.

At 1705, the UE may determine sets of beamforming weights for uplink communications, each set of the sets of beamforming weights corresponding to a respective transmit beam of a set of transmit beams, each transmit beam of the set of transmit beams having a same main lobe signal strength property as each other transmit beam of the set of transmit beams, and each transmit beam of the set of transmit beams further having one or more side lobe signal strength properties that are different than one or more side lobe signal strength properties of each of the other transmit beams of the set of transmit beams. The operations of 1705 may be performed according to the methods described herein. In some examples, aspects of the operations of 1705 may be performed by a beamforming weight component as described with reference to FIGS. 5-8.

At 1710, the UE may transmit a set of signals, each signal of the set of signals transmitted on a respective transmit beam of the set of transmit beams. The operations of 1710 may be performed according to the methods described herein. In some examples, aspects of the operations of 1710 may be performed by a beam training component as described with reference to FIGS. 5-8.

At 1715, the UE may receive an indication of a subset of the sets of beamforming weights after transmitting the set of signals based on at least a first transmit beam of the set of transmit beams corresponding to a first set of beamforming weight of the sets of beamforming weights causing interference at a second UE. The operations of 1715 may be performed according to the methods described herein. In some examples, aspects of the operations of 1715 may be performed by a subset indication component as described with reference to FIGS. 5-8.

At 1720, the UE may receive an indication of one or more sets of beamforming weights of the sets of beamforming weights to not use for subsequent transmissions. The operations of 1720 may be performed according to the methods described herein. In some examples, aspects of the operations of 1720 may be performed by a subset indication component as described with reference to FIGS. 5-8.

At 1725, the UE may transmit a second signal using a second set of beamforming weights of the sets of beamforming weights based on the indication, the subset of the sets of beamforming weights including the second set of beamforming weights. The operations of 1725 may be performed according to the methods described herein. In some examples, aspects of the operations of 1725 may be performed by an interference mitigation component as described with reference to FIGS. 5-8.

Figure 18:
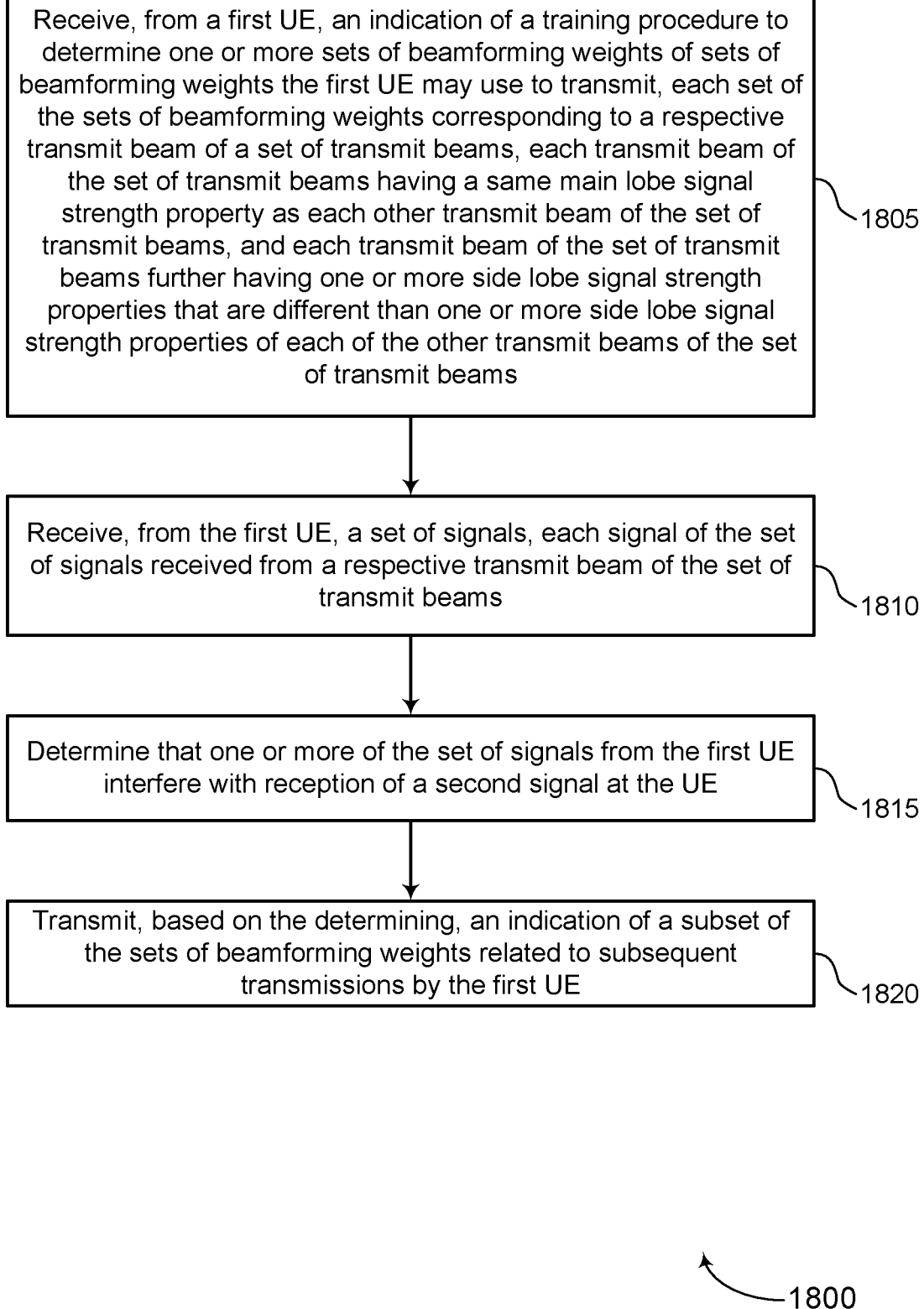

FIG. 18 shows a flowchart illustrating a method 1800 that supports beam training in large bandwidth mmW systems in accordance with aspects of the present disclosure. The operations of method 1800 may be implemented by a UE 115 or its components. For example, the operations of method 1800 may be performed by a communications manager as described with reference to FIGS. 5-8. In some examples, a UE may execute a set of instructions to control the functional elements of the UE to perform the functions described below. Additionally or alternatively, a UE may perform aspects of the functions described below using special-purpose hardware.

At 1805, the UE may receive, from a first UE, an indication of a training procedure to determine one or more sets of beamforming weights of sets of beamforming weights the first UE may use to transmit, each set of the sets of beamforming weights corresponding to a respective transmit beam of a set of transmit beams, each transmit beam of the set of transmit beams having a same main lobe signal strength property as each other transmit beam of the set of transmit beams, and each transmit beam of the set of transmit beams further having one or more side lobe signal strength properties that are different than one or more side lobe signal strength properties of each of the other transmit beams of the set of transmit beams. The operations of 1805 may be performed according to the methods described herein. In some examples, aspects of the operations of 1805 may be performed by a training procedure indication component as described with reference to FIGS. 5-8.

At 1810, the UE may receive, from the first UE, a set of signals, each signal of the set of signals received from a respective transmit beam of the set of transmit beams. The operations of 1810 may be performed according to the methods described herein. In some examples, aspects of the operations of 1810 may be performed by a beam training procedure component as described with reference to FIGS. 5-8.

At 1815, the UE may determine that one or more of the set of signals from the first UE interfere with reception of a second signal at the UE. The operations of 1815 may be performed according to the methods described herein. In some examples, aspects of the operations of 1815 may be performed by an interference determination component as described with reference to FIGS. 5-8.

At 1820, the UE may transmit, based on the determining, an indication of a subset of the sets of beamforming weights related to subsequent transmissions by the first UE. The operations of 1820 may be performed according to the methods described herein. In some examples, aspects of the operations of 1820 may be performed by a beamforming weight subset indicator as described with reference to FIGS. 5-8.

Figure 19:
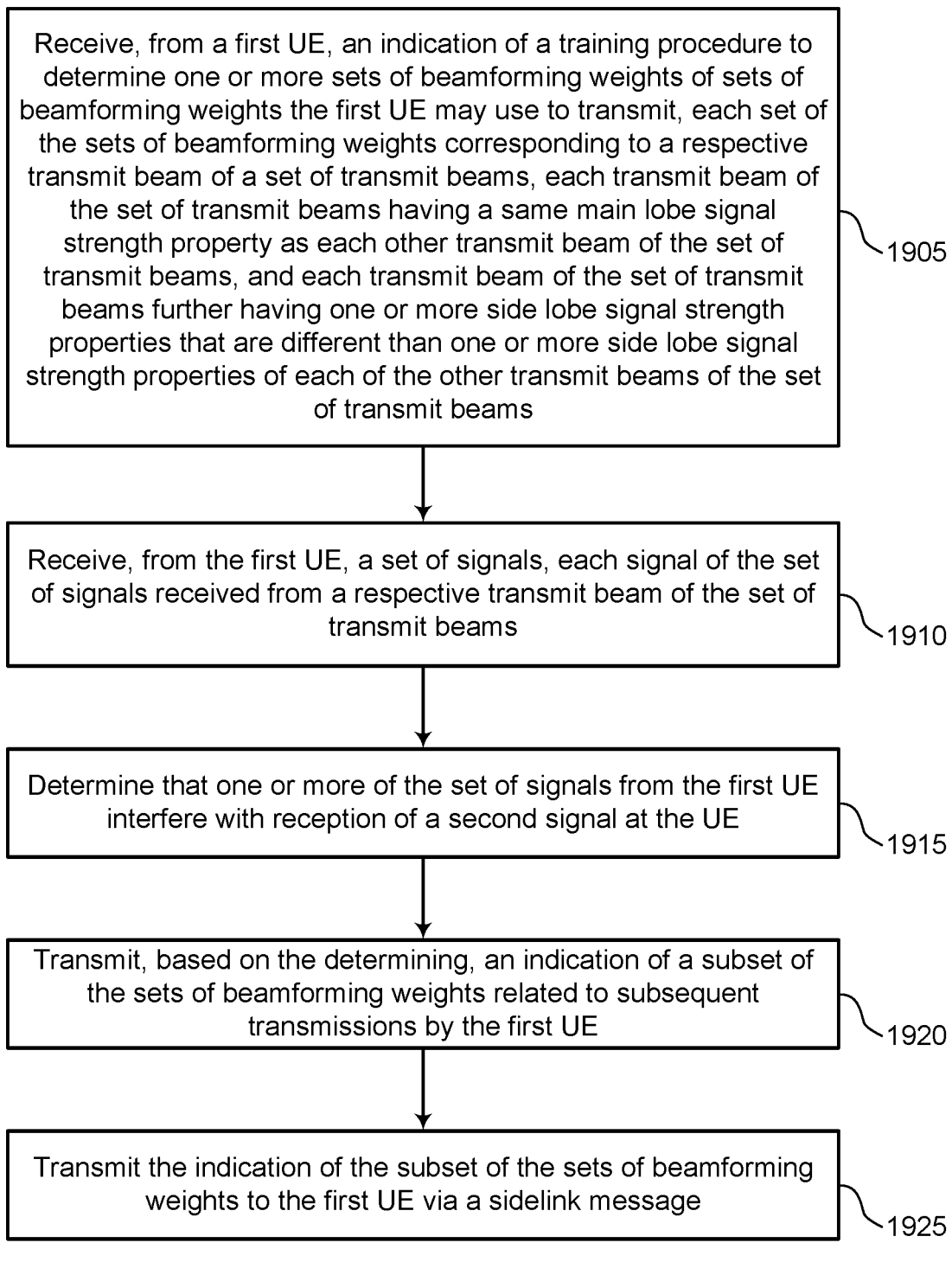

FIG. 19 shows a flowchart illustrating a method 1900 that supports beam training in large bandwidth mmW systems in accordance with aspects of the present disclosure. The operations of method 1900 may be implemented by a UE 115 or its components. For example, the operations of method 1900 may be performed by a communications manager as described with reference to FIGS. 5-8. In some examples, a UE may execute a set of instructions to control the functional elements of the UE to perform the functions described below. Additionally or alternatively, a UE may perform aspects of the functions described below using special-purpose hardware.

At 1905, the UE may receive, from a first UE, an indication of a training procedure to determine one or more sets of beamforming weights of sets of beamforming weights the first UE may use to transmit, each set of the sets of beamforming weights corresponding to a respective transmit beam of a set of transmit beams, each transmit beam of the set of transmit beams having a same main lobe signal strength property as each other transmit beam of the set of transmit beams, and each transmit beam of the set of transmit beams further having one or more side lobe signal strength properties that are different than one or more side lobe signal strength properties of each of the other transmit beams of the set of transmit beams. The operations of 1905 may be performed according to the methods described herein. In some examples, aspects of the operations of 1905 may be performed by a training procedure indication component as described with reference to FIGS. 5-8.

At 1910, the UE may receive, from the first UE, a set of signals, each signal of the set of signals received from a respective transmit beam of the set of transmit beams. The operations of 1910 may be performed according to the methods described herein. In some examples, aspects of the operations of 1910 may be performed by a beam training procedure component as described with reference to FIGS. 5-8.

At 1915, the UE may determine that one or more of the set of signals from the first UE interfere with reception of a second signal at the UE. The operations of 1915 may be performed according to the methods described herein. In some examples, aspects of the operations of 1915 may be performed by an interference determination component as described with reference to FIGS. 5-8.

At 1920, the UE may transmit, based on the determining, an indication of a subset of the sets of beamforming weights related to subsequent transmissions by the first UE. The operations of 1920 may be performed according to the methods described herein. In some examples, aspects of the operations of 1920 may be performed by a beamforming weight subset indicator as described with reference to FIGS. 5-8.

At 1925, the UE may transmit the indication of the subset of the sets of beamforming weights to the first UE via a sidelink message. The operations of 1925 may be performed according to the methods described herein. In some examples, aspects of the operations of 1925 may be performed by a beamforming weight subset indicator as described with reference to FIGS. 5-8.

Figure 20:
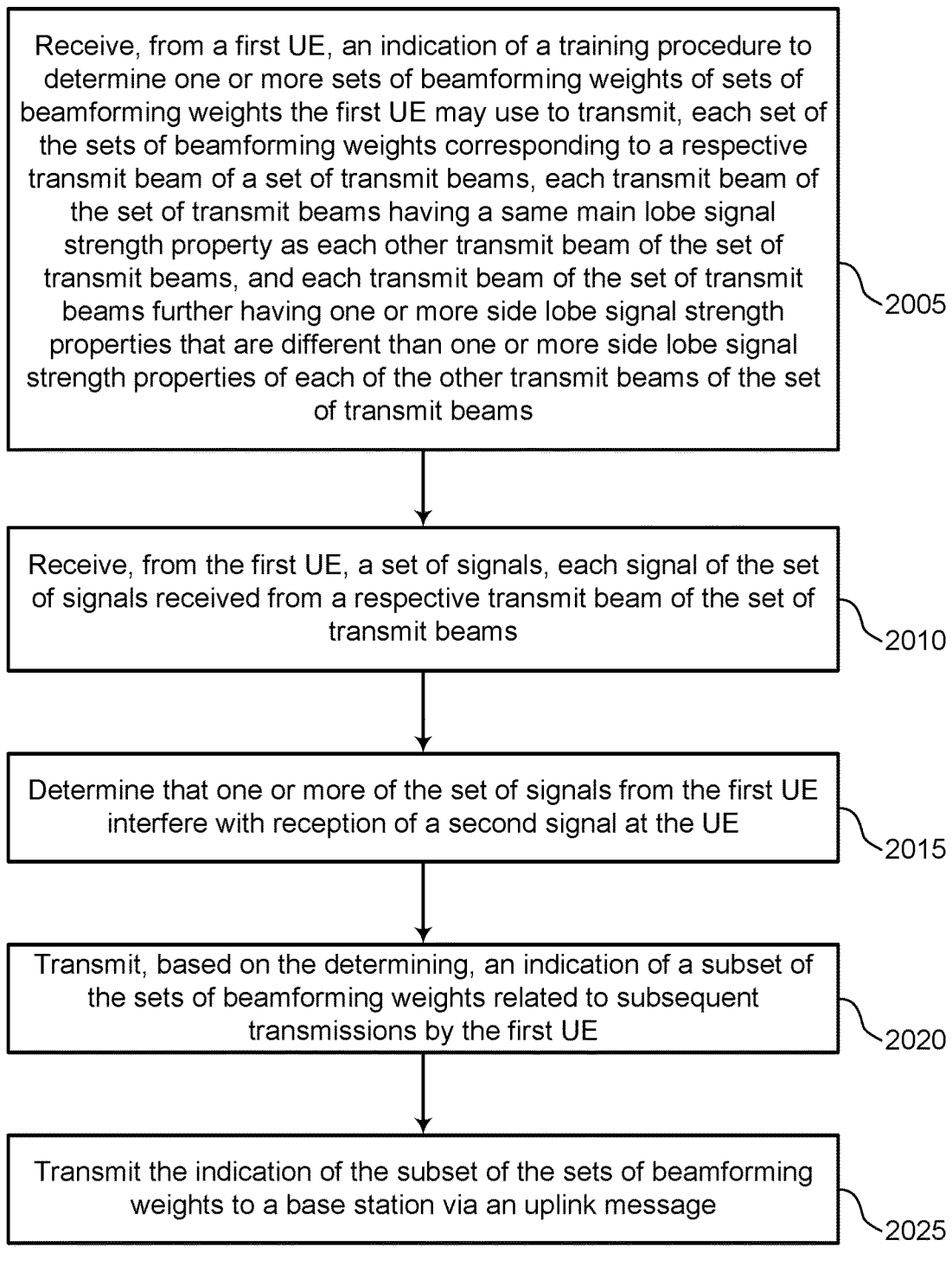

FIG. 20 shows a flowchart illustrating a method 2000 that supports beam training in large bandwidth mmW systems in accordance with aspects of the present disclosure. The operations of method 2000 may be implemented by a UE 115 or its components. For example, the operations of method 2000 may be performed by a communications manager as described with reference to FIGS. 5-8. In some examples, a UE may execute a set of instructions to control the functional elements of the UE to perform the functions described below. Additionally or alternatively, a UE may perform aspects of the functions described below using special-purpose hardware.

At 2005, the UE may receive, from a first UE, an indication of a training procedure to determine one or more sets of beamforming weights of sets of beamforming weights the first UE may use to transmit, each set of the sets of beamforming weights corresponding to a respective transmit beam of a set of transmit beams, each transmit beam of the set of transmit beams having a same main lobe signal strength property as each other transmit beam of the set of transmit beams, and each transmit beam of the set of transmit beams further having one or more side lobe signal strength properties that are different than one or more side lobe signal strength properties of each of the other transmit beams of the set of transmit beams. The operations of 2005 may be performed according to the methods described herein. In some examples, aspects of the operations of 2005 may be performed by a training procedure indication component as described with reference to FIGS. 5-8.

At 2010, the UE may receive, from the first UE, a set of signals, each signal of the set of signals received from a respective transmit beam of the set of transmit beams. The operations of 2010 may be performed according to the methods described herein. In some examples, aspects of the operations of 2010 may be performed by a beam training procedure component as described with reference to FIGS. 5-8.

At 2015, the UE may determine that one or more of the set of signals from the first UE interfere with reception of a second signal at the UE. The operations of 2015 may be performed according to the methods described herein. In some examples, aspects of the operations of 2015 may be performed by an interference determination component as described with reference to FIGS. 5-8.

At 2020, the UE may transmit, based on the determining, an indication of a subset of the sets of beamforming weights related to subsequent transmissions by the first UE. The operations of 2020 may be performed according to the methods described herein. In some examples, aspects of the operations of 2020 may be performed by a beamforming weight subset indicator as described with reference to FIGS. 5-8.

At 2025, the UE may transmit the indication of the subset of the sets of beamforming weights to a base station via an uplink message. The operations of 2025 may be performed according to the methods described herein. In some examples, aspects of the operations of 2025 may be performed by a beamforming weight subset indicator as described with reference to FIGS. 5-8.

Figure 21:
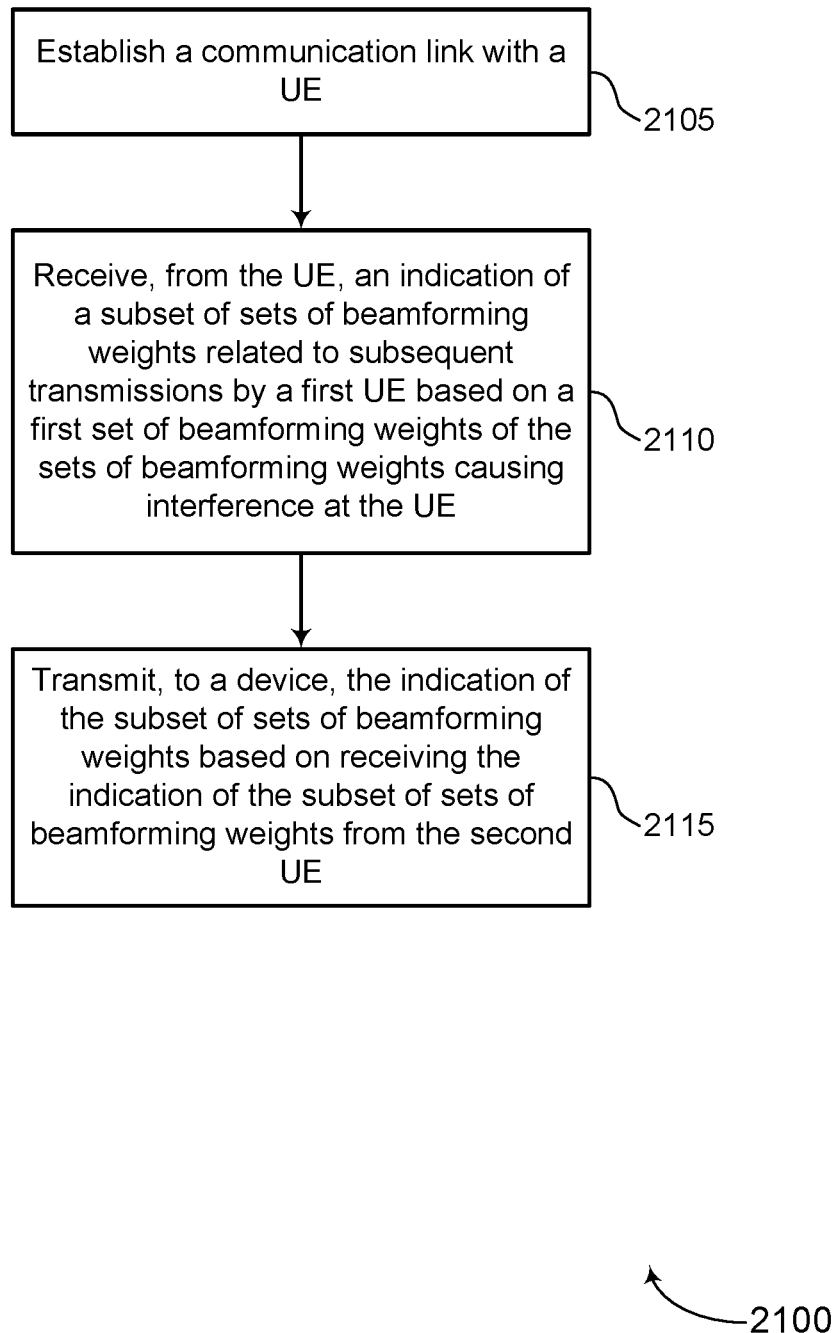

FIG. 21 shows a flowchart illustrating a method 2100 that supports beam training in large bandwidth mmW systems in accordance with aspects of the present disclosure. The operations of method 2100 may be implemented by a base station 105 or its components. For example, the operations of method 2100 may be performed by a communications manager as described with reference to FIGS. 9-12. In some examples, a base station may execute a set of instructions to control the functional elements of the base station to perform the functions described below. Additionally or alternatively, a base station may perform aspects of the functions described below using special-purpose hardware.

At 2105, the base station may establish a communication link with a UE. The operations of 2105 may be performed according to the methods described herein. In some examples, aspects of the operations of 2105 may be performed by a communication link component as described with reference to FIGS. 9-12.

At 2110, the base station may receive, from the UE, an indication of a subset of sets of beamforming weights related to subsequent transmissions by a first UE based on a first set of beamforming weights of the sets of beamforming weights causing interference at the UE. The operations of 2110 may be performed according to the methods described herein. In some examples, aspects of the operations of 2110 may be performed by a beamforming weight subset component as described with reference to FIGS. 9-12.

At 2115, the base station may transmit, to a device, the indication of the subset of sets of beamforming weights based on receiving the indication of the subset of sets of beamforming weights from the second UE. The operations of 2115 may be performed according to the methods described herein. In some examples, aspects of the operations of 2115 may be performed by a subset indicator as described with reference to FIGS. 9-12.

The following provides an overview of aspects of the present disclosure:

Aspect 1: A method for wireless communications at a first UE, comprising: determining sets of beamforming weights for uplink communications, each set of the sets of beamforming weights corresponding to a respective transmit beam of a set of transmit beams, each transmit beam of the set of transmit beams having a same main lobe signal strength property as each other transmit beam of the set of transmit beams, and each transmit beam of the set of transmit beams further having one or more side lobe signal strength properties that are different than one or more side lobe signal strength properties of each of the other transmit beams of the set of transmit beams; transmitting a set of signals, each signal of the set of signals transmitted on a respective transmit beam of the set of transmit beams; receiving an indication of a subset of the sets of beamforming weights after transmitting the set of signals based at least in part on at least a first transmit beam of the set of transmit beams corresponding to a first set of beamforming weight of the sets of beamforming weights causing interference at a second UE; and transmitting a second signal using a second set of beamforming weights of the sets of beamforming weights based at least in part on the indication, the subset of the sets of beamforming weights comprising the second set of beamforming weights.

Aspect 2: The method of aspect 1, further comprising: receiving a signal measurement report for each of the set of signals; and determining to use the second set of beamforming weights for transmitting the second signal based at least in part on the signal measurement report.

Aspect 3: The method of aspect 2, wherein the signal measurement report comprises one or more of a signal-to-noise ratio, a signal-to-interference-plus-noise ratio, or a reference signal received power.

Aspect 4: The method of any of aspects 1 through 3, wherein receiving the indication of the subset of the sets of beamforming weights comprises receiving an indication of an individual set of beamforming weights of the sets of beamforming weights to use for subsequent transmissions.

Aspect 5: The method of any of aspects 1 through 4, wherein receiving the indication of the subset of the sets of beamforming weights comprises receiving an indication of multiple sets of beamforming weights of the sets of beamforming weights to use for subsequent transmissions.

Aspect 6: The method of aspect 5, wherein the multiple sets of beamforming weights of the sets of beamforming weights are ranked in an order of increasing interference for the subsequent transmissions.

Aspect 7: The method of any of aspects 1 through 6, wherein receiving the indication of the subset of the sets of beamforming weights comprises receiving an indication of one or more sets of beamforming weights of the sets of beamforming weights to not use for subsequent transmissions.

Aspect 8: The method of any of aspects 1 through 7, wherein receiving the indication of the subset of the sets of beamforming weights comprises receiving the indication of the subset of the sets of beamforming weights from the second UE via a sidelink message.

Aspect 9: The method of any of aspects 1 through 8, wherein receiving the indication of the subset of the sets of beamforming weights comprises receiving the indication of the subset of the sets of beamforming weights from a base station via a downlink message.

Aspect 10: The method of any of aspects 1 through 9, wherein transmitting the set of signals comprises transmitting the set of signals using each transmit beam of the set of transmit beams.

Aspect 11: The method of any of aspects 1 through 10, wherein the same main lobe signal strength property comprises one or more of a same peak beamforming array gain, a same peak beamforming array gain direction, a same main lobe beamwidth, or a same gain distribution of the main lobe.

Aspect 12: The method of any of aspects 1 through 11, wherein the same main lobe signal strength property for each transmit beam of the set of transmit beams comprises a main lobe associated with each respective transmit beam being within a threshold signal strength of respective main lobes associated with each other transmit beam of the set of transmit beams.

Aspect 13: The method of any of aspects 1 through 12, wherein the first UE and the second UE operate in a range of frequencies above 7.125 GHz.

Aspect 14: A method for wireless communications at a UE, comprising: receiving, from a first UE, an indication of a training procedure to determine one or more sets of beamforming weights of sets of beamforming weights to be used by the first UE to transmit, each set of the sets of beamforming weights corresponding to a respective transmit beam of a set of transmit beams, each transmit beam of the set of transmit beams having a same main lobe signal strength property as each other transmit beam of the set of transmit beams, and each transmit beam of the set of transmit beams further having one or more side lobe signal strength properties that are different than one or more side lobe signal strength properties of each of the other transmit beams of the set of transmit beams; receiving, from the first UE, a set of signals, each signal of the set of signals received from a respective transmit beam of the set of transmit beams; determining that one or more of the set of signals from the first UE interfere with reception of a second signal at the UE; and transmitting, based at least in part on the determining, an indication of a subset of the sets of beamforming weights related to subsequent transmissions by the first UE.

Aspect 15: The method of aspect 14, further comprising transmitting a signal measurement report for each of the set of signals, wherein the subset of the sets of beamforming weights is indicated based at least in part on the signal measurement report.

Aspect 16: The method of aspect 15, wherein the signal measurement report comprises one or more of a signal-to-noise ratio, a signal-to-interference-plus-noise ratio, or a reference signal received power.

Aspect 17: The method of any of aspects 15 through 16, wherein the second signal comprises an uplink message from a base station, a sidelink message from an additional UE, or both.

Aspect 18: The method of any of aspects 14 through 17, wherein transmitting the indication of the subset of the sets of beamforming weights comprises transmitting an indication of an individual set of beamforming weights of the sets of beamforming weights to use for the subsequent transmissions by the first UE.

Aspect 19: The method of any of aspects 14 through 18, wherein transmitting the indication of the subset of the sets of beamforming weights comprises transmitting an indication of multiple sets of beamforming weights of the sets of beamforming weights to use for the subsequent transmissions by the first UE.

Aspect 20: The method of aspect 19, wherein the multiple sets of beamforming weights of the sets of beamforming weights are ranked in an order of increasing interference for the subsequent transmissions.

Aspect 21: The method of any of aspects 14 through 20, wherein transmitting the indication of the subset of the sets of beamforming weights comprises transmitting an indication of one or more sets of beamforming weights of the sets of beamforming weights to not use for the subsequent transmissions by the first UE.

Aspect 22: The method of any of aspects 14 through 21, wherein receiving the set of signals comprises receiving the set of signals based at least in part on each set of the sets of beamforming weights.

Aspect 23: The method of any of aspects 14 through 22, wherein transmitting the indication of the subset of the sets of beamforming weights comprises transmitting the indication of the subset of the sets of beamforming weights to the first UE via a sidelink message.

Aspect 24: The method of any of aspects 14 through 23, wherein transmitting the indication of the subset of the sets of beamforming weights comprises transmitting the indication of the subset of the sets of beamforming weights to a base station via an uplink message.

Aspect 25: The method of any of aspects 14 through 24, wherein the same main lobe signal strength property comprises one or more of a same peak beamforming array gain, a same peak beamforming array gain direction, a same main lobe beamwidth, or a same gain distribution of the main lobe.

Aspect 26: The method of any of aspects 14 through 25, wherein main lobes of each of the set of beamforming weights are within a threshold signal strength of each other.

Aspect 27: The method of any of aspects 14 through 26, wherein the UE and the first UE operate in a range of frequencies above 7.125 GHz.

Aspect 28: A method for wireless communications at a base station, comprising: establishing a communication link with a UE; receiving, from the UE, an indication of a subset of sets of beamforming weights related to subsequent transmissions by a first UE based at least in part on a first set of beamforming weights of the sets of beamforming weights causing interference at the UE; and transmitting, to a device, the indication of the subset of sets of beamforming weights based at least in part on receiving the indication of the subset of sets of beamforming weights from the second UE.

Aspect 29: The method of aspect 28, further comprising: receiving, from the UE, a signal measurement report for a set of signals transmitted by the first UE using the sets of beamforming weights; and determining the subset of sets of beamforming weights related to the subsequent transmissions by the first UE based at least in part on the signal measurement report.

Aspect 30: The method of aspect 29, wherein the signal measurement report comprises one or more of a signal-to-noise ratio, a signal-to-interference-plus-noise ratio, or a reference signal received power.

Aspect 31: The method of any of aspects 28 through 30, wherein transmitting the indication of the subset of sets of beamforming weights comprises transmitting an indication of an individual set of beamforming weight of the sets of beamforming weights to use for the subsequent transmissions by the first UE.

Aspect 32: The method of any of aspects 28 through 31, wherein transmitting the indication of the subset of sets of beamforming weights comprises transmitting an indication of multiple sets of beamforming weights of the sets of beamforming weights to use for the subsequent transmissions by the first UE.

Aspect 33: The method of aspect 32, wherein the multiple sets of beamforming weights of the sets of beamforming weights are ranked in an order of increasing interference for the subsequent transmissions.

Aspect 34: The method of any of aspects 28 through 33, wherein transmitting the indication of the subset of sets of beamforming weights comprises transmitting an indication of one or more sets of beamforming weights of the sets of beamforming weights to not use for the subsequent transmissions by the first UE.

Aspect 35: The method of any of aspects 28 through 34, wherein transmitting the indication of the subset of sets of beamforming weights comprises transmitting the indication of the subset of sets of beamforming weights to a second base station to be transmitted to the first UE.

Aspect 36: The method of any of aspects 28 through 35, wherein transmitting the indication of the subset of sets of beamforming weights comprises transmitting the indication of the subset of sets of beamforming weights to the first UE.

Aspect 37: The method of any of aspects 28 through 36, wherein each set of the sets of beamforming weights corresponds to a respective transmit beam of a set of transmit beams, each transmit beam of the set of transmit beams having a same main lobe signal strength property as each other transmit beam of the set of transmit beams, and each transmit beam of the set of transmit beams further having one or more side lobe signal strength properties that are different than one or more side lobe signal strength properties of each of the other transmit beams of the set of transmit beams.

Aspect 38: The method of any of aspects 28 through 37, wherein the base station, the first UE, and the UE operate in a range of frequencies above 7.125 GHz.

Aspect 39: An apparatus for wireless communications at a first UE, comprising a processor; memory coupled with the processor; and instructions stored in the memory and executable by the processor to cause the apparatus to perform a method of any of aspects 1 through 13.

Aspect 40: An apparatus for wireless communications at a first UE, comprising at least one means for performing a method of any of aspects 1 through 13.

Aspect 41: A non-transitory computer-readable medium storing code for wireless communications at a first UE, the code comprising instructions executable by a processor to perform a method of any of aspects 1 through 13.

Aspect 42: An apparatus for wireless communications at a UE, comprising a processor; memory coupled with the processor; and instructions stored in the memory and executable by the processor to cause the apparatus to perform a method of any of aspects 14 through 27.

Aspect 43: An apparatus for wireless communications at a UE, comprising at least one means for performing a method of any of aspects 14 through 27.

Aspect 44: A non-transitory computer-readable medium storing code for wireless communications at a UE, the code comprising instructions executable by a processor to perform a method of any of aspects 14 through 27.

Aspect 45: An apparatus for wireless communications at a base station, comprising a processor; memory coupled with the processor; and instructions stored in the memory and executable by the processor to cause the apparatus to perform a method of any of aspects 28 through 38.

Aspect 46: An apparatus for wireless communications at a base station, comprising at least one means for performing a method of any of aspects 28 through 38.

Aspect 47: A non-transitory computer-readable medium storing code for wireless communications at a base station, the code comprising instructions executable by a processor to perform a method of any of aspects 28 through 38.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by one or more of voltages, currents, electromagnetic waves, magnetic fields or particles, optical fields or particles.

The various illustrative blocks and components described in connection with the disclosure herein may be implemented or performed with one or more of a general-purpose processor, a DSP, an ASIC, a CPU, an FPGA or other programmable logic device, discrete gate or transistor logic, or discrete hardware components designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in one or more of hardware, software executed by a processor, or firmware. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc in which disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (that is, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. The disclosure is not limited to the examples and designs described herein but is to be accorded the broadest scope consistent with the principles and novel features disclosed herein.

What is claimed is:

1. A method for wireless communications at a first user equipment (UE), comprising:
    transmitting a set of signals, each signal of the set of signals being transmitted on a respective transmit beam of a set of transmit beams, each transmit beam of the set of transmit beams being associated with a respective set of beamforming weights of a plurality of sets of beamforming weights for uplink communications;
    receiving an indication of a subset of the sets of beamforming weights after transmitting the set of signals based at least in part on at least a first transmit beam of the set of transmit beams corresponding to a first set of beamforming weight of the sets of beamforming weights causing interference at a second UE; and
    transmitting a second signal using a second set of beamforming weights of the sets of beamforming weights based at least in part on the indication, the subset of the sets of beamforming weights comprising the second set of beamforming weights.

2. The method of claim 1, further comprising:
    receiving a signal measurement report for each of the set of signals; and
    determining to use the second set of beamforming weights for transmitting the second signal based at least in part on the signal measurement report.

3. The method of claim 2, wherein the signal measurement report comprises one or more of a signal-to-noise ratio, a signal-to-interference-plus-noise ratio, or a reference signal received power.

4. The method of claim 1, wherein receiving the indication of the subset of the sets of beamforming weights comprises receiving an indication of an individual set of beamforming weights of the sets of beamforming weights to use for subsequent transmissions.

5. The method of claim 1, wherein receiving the indication of the subset of the sets of beamforming weights comprises receiving an indication of multiple sets of beamforming weights of the sets of beamforming weights to use for subsequent transmissions.

6. The method of claim 5, wherein the multiple sets of beamforming weights of the sets of beamforming weights are ranked in an order of increasing interference for the subsequent transmissions.

7. The method of claim 1, wherein receiving the indication of the subset of the sets of beamforming weights comprises receiving an indication of one or more sets of beamforming weights of the sets of beamforming weights to not use for subsequent transmissions.

8. The method of claim 1, wherein receiving the indication of the subset of the sets of beamforming weights comprises receiving the indication of the subset of the sets of beamforming weights from the second UE via a sidelink message.

9. The method of claim 1, wherein receiving the indication of the subset of the sets of beamforming weights comprises receiving the indication of the subset of the sets of beamforming weights from a base station via a downlink message.

10. The method of claim 1, wherein transmitting the set of signals comprises transmitting the set of signals using each transmit beam of the set of transmit beams.

11. The method of claim 1, wherein each transmit beam of the set of transmit beams has a same main lobe signal strength property as each other transmit beam of the set of transmit beams, and wherein each transmit beam of the set of transmit beams further has a respective set of one or more side lobe signal strength properties that is different than respective sets of one or more side lobe signal strength properties of the other transmit beams of the set of transmit beams.

12. The method of claim 11, wherein the same main lobe signal strength property comprises one or more of a same peak beamforming array gain, a same peak beamforming array gain direction, a same main lobe beamwidth, or a same gain distribution of a main lobe.

13. The method of claim 11, wherein the same main lobe signal strength property for each transmit beam of the set of transmit beams comprises a main lobe associated with each respective transmit beam being within a threshold signal strength of respective main lobes associated with each other transmit beam of the set of transmit beams.

14. The method of claim 1, wherein the first UE is associated with a first base station that corresponds to a first cell and the second UE is associated with a second base station that corresponds to a second cell different than the first cell.

15. A method for wireless communications at a user equipment (UE), comprising:
receiving, from a first UE, an indication of one or more sets of beamforming weights of sets of beamforming weights to be used by the first UE for uplink communications;
receiving, from the first UE, a set of signals, each signal of the set of signals being received from a respective transmit beam of a set of transmit beams, each transmit beam of the set of transmit beams being associated with a respective set of beamforming weights of the one or more sets of beamforming weights for the uplink communications; and
transmitting, based at least in part on one or more of the set of signals from the first UE interfering with reception of a second signal at the UE, an indication of a subset of the sets of beamforming weights related to subsequent transmissions by the first UE.

16. The method of claim 15, further comprising transmitting a signal measurement report for each of the set of signals, wherein the subset of the sets of beamforming weights is indicated based at least in part on the signal measurement report.

17. The method of claim 16, wherein the signal measurement report comprises one or more of a signal-to-noise ratio, a signal-to-interference-plus-noise ratio, or a reference signal received power.

18. The method of claim 15, wherein transmitting the indication of the subset of the sets of beamforming weights comprises transmitting an indication of an individual set of beamforming weights of the sets of beamforming weights to use for the subsequent transmissions by the first UE.

19. The method of claim 15, wherein transmitting the indication of the subset of the sets of beamforming weights comprises transmitting an indication of multiple sets of beamforming weights of the sets of beamforming weights to use for the subsequent transmissions by the first UE.

20. The method of claim 19, wherein the multiple sets of beamforming weights of the sets of beamforming weights are ranked in an order of increasing interference for the subsequent transmissions.

21. The method of claim 15, wherein transmitting the indication of the subset of the sets of beamforming weights comprises transmitting an indication of the one or more sets of beamforming weights of the sets of beamforming weights to not use for the subsequent transmissions by the first UE.

22. The method of claim 15, wherein receiving the set of signals comprises receiving the set of signals based at least in part on each set of the sets of beamforming weights.

23. The method of claim 15, wherein transmitting the indication of the subset of the sets of beamforming weights comprises transmitting the indication of the subset of the sets of beamforming weights to the first UE via a sidelink message.

24. The method of claim 15, wherein transmitting the indication of the subset of the sets of beamforming weights comprises transmitting the indication of the subset of the sets of beamforming weights to a base station via an uplink message.

25. The method of claim 15, wherein each transmit beam of the set of transmit beams has a same main lobe signal strength property as each other transmit beam of the set of transmit beams, and wherein each transmit beam of the set of transmit beams further has a respective set of one or more side lobe signal strength properties that is different than respective sets of one or more side lobe signal strength properties of the other transmit beams of the set of transmit beams.

26. Method of claim 25, wherein the same main lobe signal strength property comprises one or more of a same peak beamforming array gain, a same peak beamforming array gain direction, a same main lobe beamwidth, or a same gain distribution of a main lobe.

27. The method of claim 15, wherein main lobes of each of the one or more sets of beamforming weights are within a threshold signal strength of each other.

28. The method of claim 15, wherein the UE and the first UE operate in a range of frequencies above 7.125 gigahertz.

29. An apparatus for wireless communications at a first user equipment (UE), comprising:
a processor,
memory coupled with the processor; and
instructions stored in the memory and executable by the processor to cause the apparatus to:
transmit a set of signals, each signal of the set of signals being transmitted on a respective transmit beam of a set of transmit beams, each transmit beam of the set of transmit beams being associated with a respective set of beamforming weights of a plurality of sets of beamforming weights for uplink communications;

receive an indication of a subset of the sets of beamforming weights associated with subsequent transmissions by the first UE after transmitting the set of signals based at least in part on at least a first transmit beam of the set of transmit beams corresponding to a first set of beamforming weight of the sets of beamforming weights causing interference at a second UE; and transmit a second signal using a second set of beamforming weights of the sets of beamforming weights based at least in part on the indication.

30. An apparatus for wireless communications at a user equipment (UE), comprising:

a processor, memory coupled with the processor; and instructions stored in the memory and executable by the processor to cause the apparatus to:

receive, from a first UE, an indication of one or more sets of beamforming weights of sets of beamforming weights to be used by the first UE for uplink communications;

receive, from the first UE, a set of signals, each signal of the set of being signals received from a respective transmit beam of a set of transmit beams, each transmit beam of the set of transmit beams being associated with a respective set of beamforming weights of the one or more sets of beamforming weights for the uplink communications; and transmit, based at least in part on one or more of the set of signals from the first UE interfering with reception of a second signal at the UE, an indication of a subset of the sets of beamforming weights related to subsequent transmissions by the first UE.

* * * * *